US010669470B2

(12) United States Patent
Fouchard et al.

(10) Patent No.: US 10,669,470 B2
(45) Date of Patent: Jun. 2, 2020

(54) DILUTION SKID AND INJECTION SYSTEM FOR SOLID/HIGH VISCOSITY LIQUID CHEMICALS

(71) Applicant: Ecolab USA Inc., St. Paul, MN (US)

(72) Inventors: David Marc Daniel Fouchard, Sugar Land, TX (US); Saugata Gon, Sugar Land, TX (US)

(73) Assignee: Ecolab USA Inc., St. Paul, MN (US)

( * ) Notice: Subject to any disclaimer, the term of this patent is extended or adjusted under 35 U.S.C. 154(b) by 0 days.

(21) Appl. No.: 15/987,623

(22) Filed: May 23, 2018

(65) Prior Publication Data

US 2018/0340114 A1 Nov. 29, 2018

Related U.S. Application Data

(60) Provisional application No. 62/509,983, filed on May 23, 2017.

(51) Int. Cl.

| | |
|---|---|
| *E21B 33/068* | (2006.01) |
| *E21B 37/06* | (2006.01) |
| *E21B 41/00* | (2006.01) |
| *E21B 41/02* | (2006.01) |
| *B01F 3/12* | (2006.01) |
| *C09K 8/524* | (2006.01) |

(Continued)

(52) U.S. Cl.
CPC ............. *C09K 8/54* (2013.01); *B01F 3/1271* (2013.01); *C09K 8/524* (2013.01); *C09K 8/536* (2013.01); *E21B 33/068* (2013.01); *E21B 37/06* (2013.01); *E21B 41/00* (2013.01); *E21B 41/02* (2013.01); *C09K 2208/26* (2013.01)

(58) Field of Classification Search
CPC ........ E21B 33/068; E21B 37/06; E21B 41/00; E21B 41/02; B01F 3/1271; C09K 8/524; C09K 8/536; C09K 8/54

See application file for complete search history.

(56) References Cited

U.S. PATENT DOCUMENTS

| | | | |
|---|---|---|---|
| 2,364,222 A | 12/1944 | Kaufman | |
| 2,599,385 A | 6/1952 | Gross et al. | |

(Continued)

FOREIGN PATENT DOCUMENTS

| | | |
|---|---|---|
| CA | 2839611 A1 | 7/2015 |
| CN | 1487048 A | 4/2004 |

(Continued)

OTHER PUBLICATIONS

Brown, J. Mike, et al., Laboratory and Field Studies of Long-term Release Rates for a Solid Scale Inhibitor, SPE 140177 SPE International (2011) Society of Petroleum Engineers, 7 pages.

(Continued)

*Primary Examiner* — Matthew R Buck
(74) *Attorney, Agent, or Firm* — Stinson LLP

(57) ABSTRACT

Systems, methods and apparatus for injecting a diluted solid chemical, a diluted highly viscous fluid, or a diluted fluidified solid for inhibiting, decreasing or preventing precipitation and/or deposition of foulants and/or contaminants in oilfield tubulars. The use of solid chemicals or highly viscous fluids providing ease of shipment, greater economy in storage, shipment and delivery and increased ease of use.

19 Claims, 2 Drawing Sheets

(51) Int. Cl.
  *C09K 8/536* (2006.01)
  *C09K 8/54* (2006.01)

(56) References Cited

U.S. PATENT DOCUMENTS

| | | |
|---|---|---|
| 2,836,559 A | 5/1958 | Bock et al. |
| 3,355,315 A | 11/1967 | Jorda et al. |
| 3,390,085 A | 6/1968 | Floeck |
| 3,454,379 A | 7/1969 | Isaacson et al. |
| 3,531,409 A | 9/1970 | Seffens et al. |
| 3,563,315 A | 2/1971 | Claytor, Jr. et al. |
| 3,600,311 A | 8/1971 | Naiman et al. |
| 3,623,979 A | 11/1971 | Maddox, Jr. et al. |
| 3,629,104 A | 12/1971 | Maddox, Jr. |
| 3,640,824 A | 2/1972 | Bucaram et al. |
| 3,661,541 A | 5/1972 | Hollyday, Jr. |
| 3,669,189 A | 6/1972 | Fischer |
| 3,682,249 A | 8/1972 | Fischer et al. |
| 3,724,553 A | 4/1973 | Snavely, Jr. et al. |
| 3,776,247 A | 12/1973 | Choufoer et al. |
| 3,840,352 A | 10/1974 | Scheffel |
| 3,841,850 A | 10/1974 | Aaron et al. |
| 3,879,177 A | 4/1975 | Andress, Jr. |
| 3,926,579 A | 12/1975 | Rossi et al. |
| 3,951,161 A | 4/1976 | Rohrback et al. |
| 4,011,906 A | 3/1977 | Alexander et al. |
| 4,045,360 A | 8/1977 | Fischer et al. |
| 4,076,728 A | 2/1978 | Maulding |
| 4,110,283 A | 8/1978 | Capelle |
| 4,175,926 A | 11/1979 | Wisotsky |
| 4,214,876 A | 7/1980 | Garth et al. |
| 4,238,451 A | 12/1980 | Ciais et al. |
| 4,388,214 A | 6/1983 | Oppenlaender et al. |
| 4,412,451 A | 11/1983 | Uusitalo et al. |
| 4,509,360 A | 4/1985 | Erwin et al. |
| 4,509,951 A | 4/1985 | Knapp |
| 4,511,366 A | 4/1985 | Burrows et al. |
| 4,518,509 A | 5/1985 | Newberry |
| 4,538,682 A | 9/1985 | McManus et al. |
| 4,582,131 A | 4/1986 | Plummer et al. |
| 4,588,640 A | 5/1986 | Matlach |
| 4,645,585 A | 2/1987 | White |
| 4,652,611 A | 3/1987 | Kuroda et al. |
| 4,654,050 A | 3/1987 | Koch et al. |
| 4,659,334 A | 4/1987 | Matlach |
| 4,670,516 A | 6/1987 | Sackmann et al. |
| 4,684,469 A | 8/1987 | Pedersen et al. |
| 4,693,312 A | 9/1987 | Lenderman |
| 4,706,509 A | 11/1987 | Riebel |
| 4,737,159 A | 4/1988 | Phillips |
| 4,767,545 A | 8/1988 | Karydas et al. |
| 4,790,666 A | 12/1988 | Koziol |
| 4,843,247 A | 6/1989 | Yamazoe et al. |
| 4,896,726 A | 1/1990 | Ayres |
| 4,900,331 A | 2/1990 | Le |
| 4,925,497 A | 5/1990 | Theirheimer, Jr. |
| 4,986,353 A | 1/1991 | Clark et al. |
| 4,997,580 A | 3/1991 | Karydas et al. |
| 5,039,432 A | 8/1991 | Ritter et al. |
| 5,062,992 A | 11/1991 | McCullough |
| 5,087,376 A | 2/1992 | Bendiksen et al. |
| 5,103,031 A | 4/1992 | Smith, Jr. |
| 5,103,914 A * | 4/1992 | LaHaye .................. E21B 41/02 166/310 |
| 5,104,556 A | 4/1992 | Al-Yazdi |
| 5,121,629 A | 6/1992 | Alba |
| 5,124,059 A | 6/1992 | Koch et al. |
| 5,132,225 A | 7/1992 | Dickakian |
| 5,209,298 A * | 5/1993 | Ayres .................. E21B 33/068 166/305.1 |
| 5,209,300 A * | 5/1993 | Ayres .................. E21B 33/068 166/305.1 |
| 5,209,301 A * | 5/1993 | Ayres .................. E21B 33/068 166/305.1 |
| 5,263,539 A | 11/1993 | Salimi et al. |
| 5,409,713 A | 4/1995 | Lokkesmoe et al. |
| 5,420,040 A | 5/1995 | Anfindsen et al. |
| 5,431,236 A | 7/1995 | Warren |
| 5,453,188 A | 9/1995 | Florescu et al. |
| 5,503,645 A | 4/1996 | Jung et al. |
| 5,546,792 A | 8/1996 | Becker |
| 5,674,538 A | 10/1997 | Lokkesmoe et al. |
| 5,683,724 A | 11/1997 | Hei |
| 5,750,070 A | 5/1998 | Tang et al. |
| 5,969,237 A | 10/1999 | Jones et al. |
| 6,111,261 A | 8/2000 | Bolza-Schunemann et al. |
| 6,180,683 B1 | 1/2001 | Miller et al. |
| 6,204,420 B1 | 3/2001 | Miller et al. |
| 6,206,103 B1 | 3/2001 | Zaid et al. |
| 6,213,214 B1 | 4/2001 | Zaid et al. |
| 6,270,653 B1 | 8/2001 | Gochin et al. |
| 6,313,367 B1 | 11/2001 | Breen |
| 6,369,004 B1 | 4/2002 | Klug et al. |
| 6,401,538 B1 | 6/2002 | Han et al. |
| 6,481,268 B1 | 11/2002 | Povey et al. |
| 6,491,824 B1 | 12/2002 | Lin et al. |
| 6,544,932 B2 | 4/2003 | Klug et al. |
| 6,656,353 B2 | 12/2003 | Kilawee et al. |
| 6,698,277 B2 | 3/2004 | Povey et al. |
| 6,776,188 B1 * | 8/2004 | Rajewski .............. B01F 5/0471 137/624.13 |
| 6,796,195 B2 | 9/2004 | Povey et al. |
| 6,814,885 B2 | 11/2004 | Woodward et al. |
| 6,839,137 B2 | 1/2005 | Mason et al. |
| 6,843,982 B2 | 1/2005 | Arnaud et al. |
| 6,925,392 B2 | 8/2005 | McNeil, III et al. |
| 6,946,524 B2 | 9/2005 | Breuer et al. |
| 6,959,588 B2 | 11/2005 | Zougari et al. |
| 7,010,979 B2 | 3/2006 | Scott |
| 7,049,272 B2 | 5/2006 | Sinclair et al. |
| 7,079,242 B2 | 7/2006 | Bordelon |
| 7,097,759 B2 | 8/2006 | Mukkamala |
| 7,114,375 B2 | 10/2006 | Panetta et al. |
| 7,122,112 B2 | 10/2006 | Mukkamala et al. |
| 7,122,113 B2 | 10/2006 | Cornelisse |
| 7,179,384 B2 | 2/2007 | Moriarty et al. |
| 7,213,445 B2 | 5/2007 | Wu et al. |
| 7,223,603 B2 | 5/2007 | Rovani, Jr. et al. |
| 7,252,096 B2 | 8/2007 | Gill et al. |
| 7,402,252 B2 | 7/2008 | Kadlec et al. |
| 7,455,111 B2 | 11/2008 | Qu et al. |
| 7,479,490 B2 * | 1/2009 | Adams .................. B01F 1/0033 424/489 |
| 7,493,955 B2 | 2/2009 | Gupta et al. |
| 7,537,705 B2 * | 5/2009 | Voeller .................. C02F 5/10 134/25.1 |
| 7,541,315 B2 | 6/2009 | Jennings |
| 7,542,139 B2 | 6/2009 | Bordelon |
| 7,569,150 B2 | 8/2009 | Kilawee et al. |
| 7,628,060 B2 | 12/2009 | Horsup |
| 7,632,412 B2 | 12/2009 | Johnson et al. |
| 7,638,067 B2 | 12/2009 | Hilgren et al. |
| 7,666,312 B2 | 2/2010 | Hicks |
| 7,670,993 B2 | 3/2010 | Dyer |
| 7,736,522 B2 | 6/2010 | Kilawee et al. |
| 7,740,399 B2 * | 6/2010 | Simmons .............. B01F 1/0005 366/153.1 |
| 7,754,657 B2 | 7/2010 | Trimble et al. |
| 7,772,160 B2 | 8/2010 | Greaves et al. |
| 7,776,930 B2 | 8/2010 | Ubbels |
| 7,776,931 B2 | 8/2010 | Venter et al. |
| 7,857,871 B2 | 12/2010 | Martin et al. |
| 7,871,521 B2 | 1/2011 | Monsrud et al. |
| 7,875,464 B2 | 1/2011 | Schabron et al. |
| 7,910,371 B2 | 3/2011 | Johnson |
| 7,951,298 B2 | 5/2011 | Hicks et al. |
| 7,984,642 B2 | 7/2011 | Africk et al. |
| 7,993,579 B2 | 8/2011 | Williams et al. |
| 7,994,103 B2 | 8/2011 | Campbell et al. |
| 8,012,758 B2 | 9/2011 | Enzien et al. |
| 8,153,057 B2 | 4/2012 | Hicks et al. |
| 8,241,920 B2 | 8/2012 | Schabron et al. |
| 8,273,581 B2 | 9/2012 | Schabron et al. |
| 8,349,772 B2 | 1/2013 | Notte et al. |

(56) References Cited

U.S. PATENT DOCUMENTS

| | | |
|---|---|---|
| 8,367,425 B1 | 2/2013 | Schabron et al. |
| 8,492,154 B1 | 7/2013 | Schabron et al. |
| 8,530,240 B1 | 9/2013 | Schabron et al. |
| 8,584,513 B2 | 11/2013 | Hough et al. |
| 8,628,970 B1 | 1/2014 | Schabron et al. |
| 8,632,742 B2 | 1/2014 | Keiser et al. |
| 8,636,918 B2 | 1/2014 | Silvernail et al. |
| 8,695,707 B2 | 4/2014 | Li et al. |
| 8,771,593 B2 | 7/2014 | Hicks et al. |
| 8,945,476 B2 | 2/2015 | Carroll et al. |
| 8,980,173 B2 | 3/2015 | Fox et al. |
| 8,992,780 B2 | 3/2015 | Champion et al. |
| 9,056,268 B2 | 6/2015 | Jones et al. |
| 9,108,935 B2 | 8/2015 | Hernandez Altamirano et al. |
| 9,127,213 B2 | 9/2015 | Komalarajun et al. |
| 9,150,472 B2 | 10/2015 | Huo et al. |
| 9,193,610 B2 | 11/2015 | Smith et al. |
| 9,221,803 B2 | 12/2015 | Mena Cervantes et al. |
| 9,243,814 B2 | 1/2016 | Hicks et al. |
| 9,266,120 B2 | 2/2016 | Counter et al. |
| 9,282,260 B2 | 3/2016 | Respini |
| 9,303,488 B2 | 4/2016 | Kanstad |
| 9,309,750 B2* | 4/2016 | Coonrod ............... E21B 33/068 |
| 9,528,350 B2* | 12/2016 | Lunde .................... C02F 1/686 |
| 2003/0041508 A1 | 3/2003 | Handa et al. |
| 2003/0079879 A1 | 5/2003 | Grainger et al. |
| 2003/0149210 A1 | 8/2003 | Hurtevent et al. |
| 2003/0171221 A1 | 9/2003 | Feustel et al. |
| 2005/0239662 A1 | 10/2005 | Patel |
| 2006/0231254 A1 | 10/2006 | Peskunowicz et al. |
| 2010/0027371 A1* | 2/2010 | Lucas .................. B01F 3/1271 366/134 |
| 2010/0130385 A1 | 5/2010 | Guzmann et al. |
| 2010/0243252 A1* | 9/2010 | Luharuka .............. E21B 43/267 166/283 |
| 2011/0062058 A1 | 3/2011 | Rogel et al. |
| 2011/0066441 A1 | 3/2011 | Ovalles et al. |
| 2012/0217012 A1 | 8/2012 | Darby |
| 2012/0293186 A1 | 11/2012 | Duval et al. |
| 2013/0220616 A1 | 8/2013 | Seth et al. |
| 2013/0264289 A1 | 10/2013 | Notte et al. |
| 2013/0288934 A1* | 10/2013 | Powell ................... C09K 8/685 507/200 |
| 2014/0027121 A1 | 1/2014 | Jackson et al. |
| 2014/0110425 A1* | 4/2014 | Pahl ...................... E21B 21/062 222/1 |
| 2014/0217033 A1 | 8/2014 | Lucente-Schultz et al. |
| 2014/0260567 A1 | 9/2014 | Fouchard et al. |
| 2014/0263078 A1 | 9/2014 | Gill et al. |
| 2014/0374102 A1 | 12/2014 | Smith |
| 2015/0027955 A1 | 1/2015 | Coleman et al. |
| 2015/0133349 A1 | 5/2015 | Brooks et al. |
| 2015/0204165 A1* | 7/2015 | Yeung ................... E21B 21/062 166/244.1 |
| 2015/0259230 A1 | 9/2015 | Li et al. |
| 2017/0009557 A1 | 1/2017 | Harman et al. |
| 2017/0145788 A1 | 5/2017 | Fouchard |

FOREIGN PATENT DOCUMENTS

| | | |
|---|---|---|
| CN | 1220749 C | 9/2005 |
| CN | 101768430 A | 7/2010 |
| CN | 101781767 A | 7/2010 |
| CN | 202152667 U | 2/2012 |
| CN | 204460665 U | 7/2015 |
| CN | 205714106 U | 12/2016 |
| DE | 2612757 A1 | 9/1977 |
| EP | 2 660 298 A1 | 11/2013 |
| JP | 2002361115 A | 12/2002 |
| WO | 2016/053288 A1 | 4/2016 |
| WO | 2016/174413 A1 | 11/2016 |
| WO | 2016/174414 A1 | 11/2016 |
| WO | 2016/187672 A1 | 12/2016 |

OTHER PUBLICATIONS

Halliburton Communications, Product Enhancement, Paraffin and Asphaltene Control (2005), 4 pages.

Kumar, Deepak et al., Scale Inhibition using Nano-silica Particles, SPE 149321 SPE International (2012) Society of Petroleum Engineers, 7 pages.

Smith, Tony et al., Solid Paraffin Inhibitor Pumped in a Hydraulic Fracture Provides Long-Term Paraffin Inhibition in Permian Basin Wells, SPE 124868 SPE International (2009) Society of Petroleum Engineers, 10 pages.

Szymczak, Stephen et al., Well Stimulation Using a Solid, Proppant-Sized, Paraffin Inhibitor to Reduce Costs and Increase Production for a South Texas, Eagle Ford Shale Oil Operator, SPE 168169 SPE International (2014) Society of Petroleum Engineers, 6 pages.

Willmon J.G. et al., From Precommissioning to Startup: Getting Chemical Injection Right, Society of Petroleum Engineers (2006), pp. 483-491.

Baker Hughes, Material Safety Data Sheet dated Oct. 10, 2012, 7 pages.

Chongqing Weiyun Techology Development Co., Ltd., Xmas Tree Downhole Chemical Injection Skid Equipment (http://cqweiyun.en.alibaba.com/product/1801490323-801123600), Jun. 8, 2015, 6 pages.

Product Data Sheet for Elvax for Industrial & Consumer Products (2016), 2 pages.

DuPont Elvax EVA copolymer resins Grade Selection Guide (2015), 4 pages.

LEDA Egypt Company, ISO 9001:2008 Manufacturing of Chemical Injection Skids, Issue 1, Apr. 8, 2015, 17 pages.

International Search Report and Written Opinion dated Sep. 7, 2018 relating to PCT Patent Application No. PCT/US2018/034113, 12 pages.

International Search Report and Written Opinion dated Nov. 2, 2018 relating to PCT Patent Application No. PCT/US2018/034126, 12 pages.

\* cited by examiner

DILUTION SKID AND INJECTION SYSTEM FOR SOLID/HIGH VISCOSITY LIQUID CHEMICALS

CROSS-REFERENCE TO RELATED APPLICATION

This application claims priority to U.S. Provisional Patent Application Ser. No. 62/509,983 filed on May 23, 2017, the disclosure of which is incorporated herein by reference in its entirety.

FIELD OF THE INVENTION

Systems, methods and apparatus for injecting a diluted solid chemical, a diluted highly viscous fluid, or a diluted fluidified solid for inhibiting, decreasing or preventing precipitation and/or deposition of foulants and/or contaminants in oilfield tubulars. The use of solid chemicals or highly viscous fluids providing ease of shipment, greater economy in storage, shipment and delivery and increased ease of use.

BACKGROUND OF THE INVENTION

Crude oil from geological formations can contain a variety of contaminants and foulants, including solid impurities, gasses and minerals. Solid contaminants and foulants can include waxes, asphaltenes, and various hydrates, while contaminating minerals can include sulfur, iron, vanadium, zinc and various mineral/inorganic salts, such as Barite (Barium sulfate), Calcite (Calcium carbonate) and Halite (Sodium chloride). When crude oil is pumped from a formation and transported via drilling and production tubulars and transmission pipelines, these contaminants can precipitate out due to changes in pressure and temperature. This can result in the deposition of such contaminants throughout the system of drilling and production tubulars and pipelines. As these various deposits buildup, they can occlude the various tubulars and deposit on inner surfaces of flow lines, valves and pumps, greatly reducing the pumping efficiency and flow of oil through the drilling, production and tubular systems.

Traditionally, the problem of contaminant buildup has been addressed by various methods including drilling or re-boring of the affected tubular to cut the contaminant buildup from the interior of the pipeline; using chemical solvents to dissolve the various contaminants; using dispersing agents, including surfactants, to obstruct adherence to tubular walls; using hot oil, hot water, or steam to melt the deposits; and using chemical inhibitors in attempts to prevent deposition of foulants. However, each method of addressing contaminant buildup does have its limitations and can involve substantive cost and production downtime.

As an example, crude oil contaminants can be unique for each oil deposit and oil well. Consequently, chemical solvents and methods to remediate such contaminants can be unique to each oil well. Each specific type of contaminant can require a distinct formulation and carrier fluid/solvent for effective application. For example, paraffins are soluble in straight chain alkanes such as hexane and heptane, while asphaltenes are high molecular weight aromatic ring structures and are soluble in aromatic solvents such as xylene and toluene. Also, corrosion inhibitors can include amines, ammonia, and morpholine, while scale dissolvers can include hydrochloric acid or ethylenediamine tetraacetic acid (depending on the kind of mineral causing the scale). Determination of the specific contaminant and determination, formulation and transport of an appropriate treatment can be complex and time consuming.

As currently used, active compounds in these solvents are formulated in a carrier fluid/solvent for ease of delivery or injection into the subject product stream with a simple injection pump. While the use of such chemical additives has shown some effectiveness in inhibiting contaminant depositions, the use of such liquid or solvent based inhibitors greatly increases the cost of transport, storage, and safety of various inhibitor compounds. This is at least due in part to the large volume of solvent needed to maintain the inhibitor in a liquid state, the volatility of the solvent and the noxious nature of many of the solvents.

One system for overcoming these issues comprises the use of a solid chemical as a foulant and/or contaminant inhibitor. The use of a solid chemical allows for a great reduction in transport, storage, and safety costs. However, a problem exists wherein the solid chemical cannot be directly injected into the production process, or wherein the solid chemical cannot maintain a liquid form at ambient pipe temperature. Therefore, a need exists for an efficient, safe, and economical system to provide solid chemical foulant and/or contaminant inhibitors into a production process line.

SUMMARY OF THE INVENTION

Systems, apparatus, and methods are provided that allow for chemicals in solid phase or high-viscosity liquid phase to be used on-site in crude oil applications to remediate, inhibit and/or decrease precipitation or deposits of foulants and/or contaminants to maintain or restore flow in oilfield tubulars, fittings, wellheads, wellbores, surface equipment and the like, without the need for the production and shipment of such chemical in liquid phase and with minimum energy use. Examples of such foulants and contaminants can include paraffins, asphaltenes, corrosives, and minerals that result in scales. Examples of useful types of chemicals include inhibitors and dispersants, such as paraffin inhibitors and dispersants, asphaltene inhibitors and dispersants, scale inhibitors and dispersants, and the like.

Chemicals useful in such crude oil applications are generally in the form of a solid or highly viscous liquid at ambient temperatures and pressures (approximately 20° C. and 1 atm). Using a chemical injection system, the solid chemical (or high viscosity liquid) can be fluidified at the site of use, and then mixed on-site with a solvent, or directly mixed on-site with a solvent, and introduced into the oilfield tubulars in a desired quantity or flow rate.

Systems for in-line delivery of a fluidified solid chemical (or high viscosity liquid) into an oilfield fluid stream are disclosed, the systems comprising fluidification of a chemical; passing the fluidified chemical through a chemical metering valve and to a heat-traced 3-way valve, passing the fluidified chemical through the heat-traced 3-way valve to a heat-traced mixing chamber; pumping a solvent through a solvent metering valve, through a heat-traced solvent line, and into the heat-traced mixing chamber; mixing the solvent and fluidified chemical in the heat-traced mixing chamber to achieve a desired concentration of diluted fluidified chemical; and delivering the diluted fluidified chemical into an oilfield fluid stream via a heat-traced diluted fluidified chemical line.

Further, a system for in-line delivery of a solid chemical into an oilfield fluid stream is provided, the system comprising reducing the particle diameter of the solid chemical such that the size-reduced solid chemical is flowable through a pipe; passing the size-reduced solid chemical through a chemical metering valve and to a 3-way valve, passing the size-reduced solid chemical through the 3-way valve to a heat-traced mixing chamber; pumping a solvent through a solvent metering valve, through a heat-traced solvent line, and into the heat-traced mixing chamber; mixing the solvent and size-reduced solid chemical in the heat-traced mixing chamber to achieve a desired concentration of diluted size-reduced solid chemical; and delivering the diluted size-reduced solid chemical into an oilfield fluid stream via a heat-traced diluted size-reduced solid chemical line.

Also provided is a method for delivering a chemical in-line into an oilfield fluid stream comprising the system described herein, wherein the chemical metering valve, heat-traced 3-way valve, 3-way valve, and/or solvent metering valve are manipulated such that a predetermined concentration and amount of diluted chemical is delivered in-line into the oilfield fluid stream.

These and other features and advantages as described herein will be set forth or will become more fully apparent in the description that follows and in the appended claims. The features and advantages can be realized and obtained by means of the instruments and combinations particularly pointed out in the appended claims. Furthermore, the features and advantages described can be learned by the practice of the disclosure or will be apparent from the description, as set forth hereinafter.

DETAILED DESCRIPTION OF THE INVENTION

Figure 1:
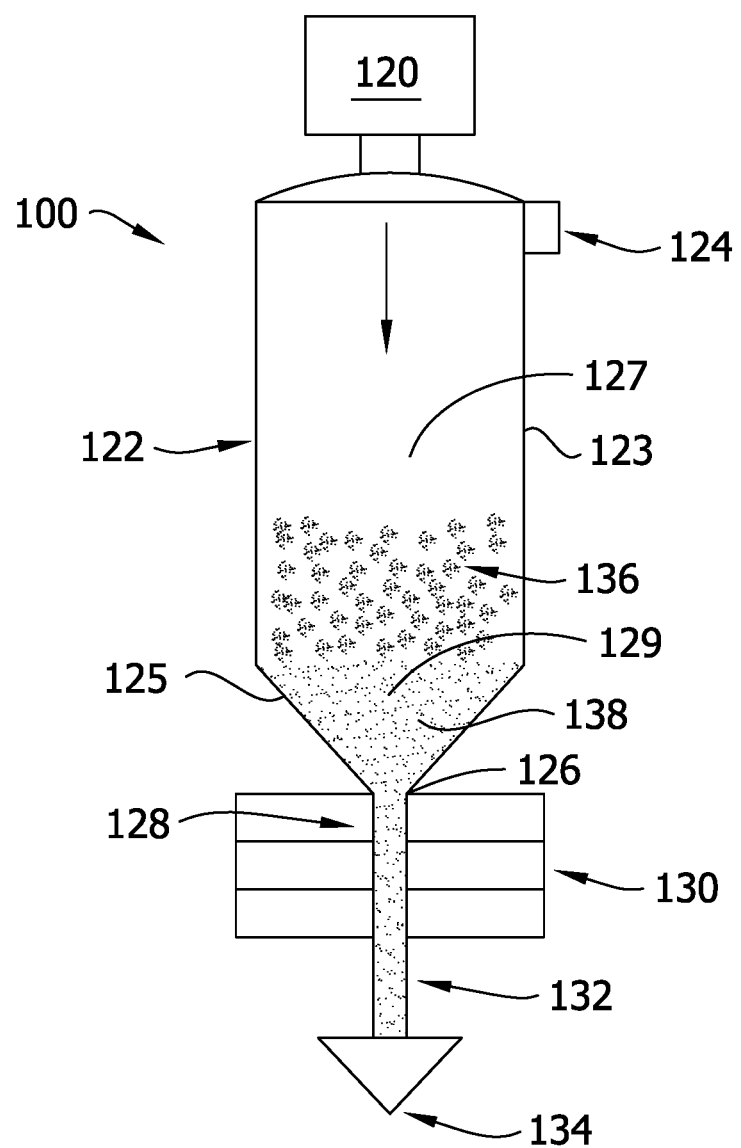
FIG. 1 is a system schematic showing the system for fluidification of a solid or high viscosity liquid chemical.

Systems, apparatus, and methods provide for removing, inhibiting and/or decreasing foulants and/or contaminant precipitated or deposited in oilfield tubulars, pipelines, fittings, wellheads, and the like. Various systems, apparatus and methods utilize a chemical injection apparatus and chemicals that are generally solid at ambient temperatures and pressures (approximately 20° C. and 1 atm) or are high-viscosity liquid chemicals that can be fluidified, mixed with a solvent, and injected by the chemical injection apparatus into the oilfield tubular at the site of use. The on-site in-line mixing of the solvent and fluidified chemical allow for a more accurate and lower overall use of solvents. Thus, the need for shipping large volumes of liquid chemicals and solvents can be greatly reduced, providing a safer and more efficient and economic manner of oilfield remediation than possible with current methods.

For example, there is provided herein a system for preventing, inhibiting or decreasing precipitation and/or deposition of undesirable matter in oilfield tubulars. The system is for on-site fluidification, mixing with a solvent, and in-line delivery of the diluted, solubilized chemical into oilfield fluid streams. The system comprises a receptacle for receiving and holding an amount of solid chemical; a heating component for targeted fluidification of the solid chemical in only a portion of the receptacle; a mixing component wherein the solid chemical or fluidified solid chemical and solvent are mixed to produce a diluted chemical or fluidified solid chemical; and a heat traced line through which the diluted chemical or fluidified solid chemical is delivered to an injection point providing access to an oilfield fluid stream.

The receptacle includes a receptacle inlet, a receptacle outlet, and a wall extending between the inlet and outlet. The wall defines an open interior volume which is in fluid communication with the receptacle inlet and receptacle outlet and comprises a first volume and a second volume, wherein the second volume is between the outlet and the first volume. The outlet conduit is connected to the outlet at a first end and being adapted for operable connection to a solid chemical metering valve at a second end. A heating component is adapted to emit heat, positioned adjacent to the receptacle outlet and separated from a majority portion of the receptacle. The majority portion of the receptacle extends away from the heating component, such that only a portion of the majority portion of the receptacle is oriented toward the heating component. The heating component can be positioned along a length of the receptacle outlet conduit. The receptacle can optionally include a mechanical handling device for controlling the flow of chemical from the first volume to the second volume.

The system further can include a valve and a pressure component, both in communication with the open interior volume of the receptacle. The valve is adapted for enabling discharge of the chemical or fluidified solid chemical in predetermined doses. The pressure component is operably connected to the receptacle and adapted to apply pressure on at least a portion of the solid chemical loaded in the open interior volume, aiding in delivering fluidified solid chemical to the chemical injection point.

The system can further comprise a discharge conduit and a discharge heating component adapted for preventing solidification of liquid phase chemical within the receptacle discharge conduit. The receptacle discharge conduit is operably connected to the valve at a first end and a chemical metering valve at a second end. The discharge heating component is adapted for preventing solidification of the solid chemical or fluidified solid chemical within the discharge conduit. For example, the receptacle discharge heating component can take the form of a heat-traced line running along the length of the receptacle discharge conduit.

After the solid chemical has been fluidified in the receptacle, the fluidified solid chemical is passed through a solid chemical metering valve to control the flow of fluidified solid chemical. The fluidified solid chemical is then passed to a heat-traced 3-way valve wherein a portion of the fluidified solid chemical can be optionally directed to the chemical injection point via a heat-traced line. The majority, or all, of the fluidified solid chemical can be passed through the heat-traced 3-way valve to a heat-traced mixing chamber. Meanwhile, a solvent is pumped from a solvent tank, through a solvent metering valve, and into the heat-traced mixing chamber via one or more heat-traced solvent line(s). The solvent and fluidified solid chemical are mixed in the heat-traced mixing chamber to achieve a desired concentration of diluted fluidified solid chemical. The desired concentration can be achieved by manipulating the solvent metering valve, solid chemical metering valve, and/or heat-traced 3-way valve in an appropriate manner. The diluted fluidified solid chemical can then be delivered into an oilfield fluid stream at a chemical injection point via a heat-traced diluted fluidified solid chemical line. Throughout the entirety of the system, valves, lines, vessels, etc. can be heat-traced in order to ensure that the contents of each valve, line, or vessel are at a temperature greater than the melting point of the contents of the valve, line, or vessel.

Further, the system, including the receptacle, heating component, receptacle discharge conduit, solvent tank, and heat-traced mixing chamber can be contained by a frame assembly of a skid, wherein the skid is positionable adjacent to the chemical injection point. Also, the frame assembly can further contain valves, pressure components, and discharge conduits as can be necessary.

Controlled discharge of the diluted fluidified chemical into an oilfield fluid stream can be performed for preventing, decreasing, or inhibiting foulant and/or contaminant deposition and/or precipitation and/or prevention of corrosion and/or modifying the properties of the production fluid in oilfield tubulars and surface equipment. The solid chemical used is a paraffin inhibitor, an asphaltene inhibitor, a corrosion inhibitor, a scale inhibitor or a foam inhibitor, an emulsion breaker, a hydrate inhibitor, or a combination thereof.

In operation, actuation of the heating component heats the second volume of the receptacle to a temperature above the melting point of the solid chemical, thereby transforming loaded solid chemical positioned in the second volume into liquid phase without substantive phase transformation of solid chemical positioned in the first volume. Further in operation, the pressure component applies pressure on at least a portion of the chemical. Fluidified solid chemical flows from the receptacle under pressure through the receptacle discharge conduit. Removal of fluidified solid chemical from the second volume of the receptacle allows solid chemical in the first volume to move toward the second volume.

The solid chemical can be comprised of less than about 15% solvent; the heating component can be adapted to enable heating of the second volume to a temperature in the range of about 80° C. to about 200° C.; and/or the heating component and the receptacle are arranged and adapted such that, at a point in time during discharging, the portion of the fluidified solid chemical represents less than 90% of the total chemical in the receptacle. The portion of the fluidified solid chemical can represent less than about 60% of the total chemical in the receptacle.

Further, a method of on-site fluidification, dilution, and in-line delivery of a diluted fluidified solid chemical into an oilfield fluid stream is disclosed. The method comprises providing an amount of solid chemical. The composition of the solid chemical is suitable in crude oil applications to remediate, inhibit, and/or decrease precipitation or deposits of foulants and/or contaminants to maintain or restore flow in oilfield tubulars, fittings, wellheads, wellbores, and the like.

The method further comprises loading the amount of solid chemical into an open interior volume of a receptacle that is located proximate to an injection point that provides access to the oilfield fluid stream. The receptacle includes a receptacle outlet and the open interior volume having a first volume and a second volume, the second volume being between the receptacle outlet and the first volume. The receptacle can optionally include a mechanical handling device for controlling the flow of chemical from the first volume to the second volume.

Further included in the method is the step of melting a first portion of the solid chemical in the second volume without melting solid chemical in the first volume. During operation, there are points in time wherein the receptacle contains amounts of solid and liquid phases of the chemical.

The method further includes transporting fluidified solid chemical from the second volume through the receptacle outlet and a receptacle outlet conduit and to a heat-traced mixing chamber wherein solvent and fluidified solid chemical are mixed, producing a diluted fluidified solid chemical. A heat-traced diluted fluidified solid chemical line is connected to the outlet of the heat-traced mixing chamber at one end and is adapted for operable connection to an injection point of the oilfield fluid stream at a second end. Thereafter the diluted fluidified solid chemical is delivered to a chemical injection point associated with an oilfield fluid stream.

The method further includes discharging the diluted fluidified solid chemical into the oilfield fluid in predetermined doses. The method comprises injecting an effective amount of the fluidified solid chemical into the oilfield fluid stream to sufficiently prevent, decrease or inhibit foulant, and/or contaminant deposits.

The fluidification is targeted melting performed using a heating component adapted to emit heat. The heating component is positioned adjacent to the receptacle outlet and separated from a majority volume of the open interior volume and at least a majority portion of the wall. The receptacle is arranged with the majority volume and majority portion extending away from the heating component, such that only a portion of the majority volume and a portion of the majority portion are oriented toward the heating component.

The method further includes applying pressure upon at least a portion of the solid chemical in the first volume using a pressure component. The applied pressure aids in melting, delivering, and passing the fluidified solid chemical through the system. Increased pressure can further be applied to reduce the energy required to melt the solid chemical in the first volume and to increase the rate of flow of liquid chemical through the system.

Further, the receptacle, optional mechanical handling device, receptacle outlet conduit, heating component, and valve can be interconnected and part of a chemical delivery apparatus. The chemical delivery apparatus can further comprise the pressure component, the pressure component being operably connected to the receptacle.

The methods and apparatus set forth above can include one or more of the following aspects: the pressure component is a pump, a compressor, a high pressure gas cylinder, a high pressure gas line, a pneumatic piston, a fluidic piston, a screw or an electromagnetic piston; the receptacle is a tank, which can be cylindrical in shape, made of metal, a metal alloy, a polymer, glass, ceramic material, or a mixture thereof; the heating component is a heating element adjacent to a length of the receptacle outlet conduit; and the valve is a metering valve or flow controller.

The methods and apparatus set forth above can include one or more of the following aspects: the solid chemical is a paraffin inhibitor, an asphaltene inhibitor, a corrosion inhibitor, a scale inhibitor or a foam inhibitor, an emulsion breaker or a hydrate inhibitor; the solid chemical comprises less than about 15% solvent; the melting is performed by heating the solid chemical in the second volume to a temperature in the range of about 80° C. to about 200° C.; and, at points in time during discharging, the portion of the fluidified solid chemical represents less than about 90% of the total amount of chemical in the receptacle; the portion of the fluidified solid chemical represents less than about 60% of the total chemical in the receptacle.

Preferably, there is also provided herein a chemical melting apparatus used in combination with a solid chemical in preventing, inhibiting or decreasing precipitation of solids and contaminants in oilfield tubulars. The apparatus comprises: (i) a receptacle, the receptacle including an inlet, an open interior portion and a receptacle outlet; (ii) a pressure component for pressurizing the receptacle or applying pressure to a portion of the receptacle contents; (iii) a heating component adapted for melting a portion of solid chemical when loaded in the receptacle; (iv) a valve in fluid communication with the receptacle for controlling flow and discharge of melted chemical; and (v) a discharge heating component adapted for heating a conduit portion downstream of the receptacle. Optionally, the chemical melting apparatus also includes a mechanical handling device for controlling the flow of chemical from the first volume to the second volume.

Additionally disclosed is a system for on-site fluidification of a high-viscosity liquid chemical, controlled mixing and dilution of the fluidified high-viscosity liquid chemical with a solvent, and in-line delivery of a diluted fluidified high-viscosity chemical into oilfield fluid streams comprising (i) a receptacle including an inlet; a receptacle outlet; and a wall extending between the inlet and outlet and defining an open interior volume, the open interior volume being in fluid communication with the inlet and receptacle outlet and comprising a first volume and a second volume, wherein the second volume is between the outlet and the first volume, and wherein the receptacle can optionally include a mechanical handling device for controlling the flow of chemical from the first volume to the second volume; (ii) a heating component adapted to emit heat, positioned adjacent to the receptacle outlet and separated from a majority volume of the open interior volume and a majority portion of the wall, wherein the majority volume and majority portion extend away from the heating component, such that only a portion of the majority volume and a portion of the majority portion are oriented toward the heating component; (iii) a receptacle outlet conduit connected to the receptacle outlet at a first end and a fluidified high-viscosity liquid chemical metering valve at a second end; (iv) a pressure component, the pressure component operably connected to the receptacle and adapted to apply pressure on at least a portion of the chemical in the open interior volume; (v) a heat-traced three way valve wherein a portion of the fluidified high-viscosity liquid chemical is optionally directed to a chemical injection point or wherein the fluidified high-viscosity liquid chemical is directed to a heat-traced mixing chamber; (vi) a solvent tank comprising solvent wherein the solvent is pumped through a solvent metering valve to the heat-traced mixing chamber; (vii) a heat-traced mixing chamber wherein the fluidified high-viscosity liquid chemical and solvent are mixed to the desired proportion to produce a diluted fluidified high-viscosity liquid chemical; and (viii) a chemical injection point adapted for enabling discharge of diluted fluidified high-viscosity liquid chemical into the oilfield fluid stream in predetermined doses, wherein, in operation with a high-viscosity liquid chemical loaded in the open interior volume, actuation of the heating component heats the second volume to a temperature above which the high-viscosity liquid chemical easily flows (e.g., having a kinematic viscosity under about 1000 cSt), thereby significantly lowering the viscosity of the liquid chemical positioned in the second volume without substantive change in the viscosity of the high-viscosity liquid chemical positioned in the first volume, the pressure component applies pressure on at least a portion of chemical in the receptacle and fluidified high-viscosity liquid chemical flows from the receptacle, through the receptacle outlet conduit, allowing high-viscosity liquid chemical in the first volume to move toward the second volume, and wherein, at a point in time during discharging from the receptacle, the portion of the fluidified high-viscosity liquid phase chemical represents less than about 90% of total chemical in the receptacle.

This system can further comprise the use of heat-traced lines, valves, and/or vessels adapted for preventing increase in the viscosity of the fluidified high-viscosity liquid chemical or diluted fluidified high-viscosity liquid chemical within said lines, valves, and/or vessels.

In the present system the fluidification of the high-viscosity liquid chemical can be performed by heating the high-viscosity liquid chemical in the second volume to a temperature in the range of about 30° C. to about 200° C.

The system can, at a point in time during discharging, have the portion of the fluidified liquid chemical represents less than about 60% of total chemical in the receptacle.

The dilution of a solid chemical without fluidification is also provided. A solid chemical can be reduced in size by a solid chemical size reduction apparatus. The size-reduced solid chemical is capable of flowing through a pipe and is directed to a chemical metering valve. The size-reduced solid chemical is then directed to a 3-way valve. The chemical is directed from the 3-way valve to a heat-traced mixing chamber. Optionally, a portion of the size-reduced solid chemical can be directed from the 3-way valve directly to an oilfield fluid stream. A solvent is passed through a solvent metering valve, a heat-traced solvent line, and into the heat-traced mixing chamber. The size-reduced solid chemical and solvent are then mixed in the heat-traced mixing chamber to produce a homogenous solution of diluted, size-reduced, solubilized solid chemical. The diluted, size-reduced, solubilized solid chemical is then directed into an oilfield fluid stream, optionally by means of a heat-traced diluted, size-reduced, solubilized solid chemical line.

The components of the chemical melting/heating or size reduction, solvent pumping, solvent and chemical mixing, and injection can be interconnected and contained in a frame assembly providing a self-contained unit. The self-contained unit can further include a skid component and/or be made to be portable. In operation, the pressure component pressurizes the receptacle holding the chemical or applies pressure to a portion of the chemical; the heating component heats at least a portion of the receptacle proximate to the receptacle outlet, melting the solid chemical or heating the high viscous liquid to provide a fluidified chemical; and the discharge heating component keeps the chemical in a fluidified state from the receptacle outlet to the heat-traced three way valve.

As described herein, the pressure component can be a pump, a compressor, a high pressure gas cylinder, a high pressure gas line, a hydraulic pump, a mechanically driven piston, a pneumatic piston, a fluidic piston, a screw, an electromagnetic piston, or any other suitable means of applying pressure.

As described herein, the receptacle is a tank, which can be cylindrical in shape. The tank can be formed of metal, a metal alloy, such as steel, a glass, a ceramic material, a polymer, such as, but not limited to, polyethylene, polymer mixtures, or a combination thereof.

The heating component can be any suitable heating device, including a heater using electric, gas, steam, or microwave energy. The heating component can be located adjacent to, in contact with, or surrounding at least a portion of the tank, for example the outlet, so as to enable the melting of the chemical. The heating component can be any suitable heating element.

The discharge valve can be any suitable valve. Examples include a metering valve, pneumatic valve, a solenoid valve, a hydraulic valve, a flow controller, or the like.

The discharge heating component can be a heat-traced line and can have a separate thermostat from the heating component. The discharge heating component can be electric, gas, steam, microwave or the like, as long as the heating component sufficiently maintains the heat of the fluidified chemical above its melting point or otherwise in a flowable condition, such that it can be mixed with a solvent and injected into a production stream.

Examples of the solid chemical or high-viscosity chemical stored in the tank include a paraffin inhibitor, an asphaltene inhibitor, a corrosion inhibitor, a scale inhibitor, a hydrate inhibitor, a biocide, an emulsion breaker, a defoamer, a foamer, a water clarifier, a polymer for enhanced oil recovery, and combinations thereof.

Paraffin inhibitors comprise, but are not limited to, ethylene-vinyl acetate copolymers, olefin-maleic anhydride copolymers and their esters, polyacrylates, alkylphenol-formaldehyde resins, and a combination thereof. Suitable paraffin inhibitors can include, but are not limited to, paraffin crystal modifiers and dispersant/crystal modifier combinations. Suitable paraffin crystal modifiers include, but are not limited to, alkyl acrylate copolymers, alkyl acrylate vinylpyridine copolymers, maleic anhydride ester copolymers, branched polyethylenes, naphthalene, anthracene, microcrystalline wax and/or asphaltenes. Suitable paraffin dispersants include, but are not limited to, dodecyl benzene sulfonate, oxyalkylated alkylphenols, and oxyalkylated alkylphenolic resins.

Asphaltene inhibitors include, but are not limited to, succinic anhydride derivatives, aliphatic sulfonic acids; alkyl aryl sulfonic acids; aryl sulfonates; lignosulfonates; alkylphenol/aldehyde resins and similar sulfonated resins; polyolefin esters; polyolefin imides; polyolefin esters with alkyl, alkylenephenyl or alkylenepyridyl functional groups; polyolefin amides; polyolefin amides with alkyl, alkylenephenyl or alkylenepyridyl functional groups; polyolefin imides with alkyl, alkylenephenyl or alkylenepyridyl functional groups; alkenyl/vinyl pyrrolidone copolymers; graft polymers of polyolefins with maleic anhydride or vinyl imidazole; hyperbranched polyester amides; polyalkoxylated asphaltenes, amphoteric fatty acids, salts of alkyl succinates, sorbitan monooleate, polyisobutylene succinic anhydride, and a combination thereof.

Corrosion inhibitors include, but are not limited to, an imidazoline compound, a quaternary amine compound, a pyridinium compound, or a combination thereof. The corrosion inhibitor can comprise an imidazoline. The imidazoline can be, for example, imidazoline derived from a diamine, such as ethylene diamine (EDA), diethylene triamine (DETA), triethylene tetraamine (TETA) etc. and a long chain fatty acid such as tall oil fatty acid (TOFA). The imidazoline can be an imidazoline of Formula (I) or an imidazoline derivative. Representative imidazoline derivatives include an imidazolinium compound of Formula (II) or a bis-quaternized compound of Formula (III).

The corrosion inhibitor can include an imidazoline of Formula (I):

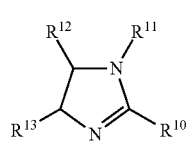

wherein $R^{10}$ is a $C_1$-$C_{20}$ alkyl or a $C_1$-$C_{20}$ alkoxyalkyl group; $R^{11}$ is hydrogen, $C_1$-$C_6$ alkyl, $C_1$-$C_6$ hydroxyalkyl, or $C_1$-$C_6$ arylalkyl; and $R^{12}$ and $R^{13}$ are independently hydrogen or a $C_1$-$C_6$ alkyl group. Preferably, the imidazoline includes an $R^{10}$ which is the alkyl mixture typical in tall oil fatty acid (TOFA), and $R^{11}$, $R^{12}$ and $R^{13}$ are each hydrogen.

The corrosion inhibitor can include an imidazolinium compound of Formula (II):

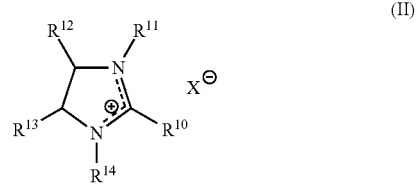

wherein $R^{10}$ is a $C_1$-$C_{20}$ alkyl or a $C_1$-$C_{20}$ alkoxyalkyl group; $R^{11}$ and $R^{14}$ are independently hydrogen, $C_1$-$C_6$ alkyl, $C_1$-$C_6$ hydroxyalkyl, or $C_1$-$C_6$ arylalkyl; $R^{12}$ and $R^{13}$ are independently hydrogen or a $C_1$-$C_6$ alkyl group; and $X^-$ is a halide (such as chloride, bromide, or iodide), carbonate, sulfonate, phosphate, or the anion of an organic carboxylic acid (such as acetate). Preferably, the imidazolinium compound includes 1-benzyl-1-(2-hydroxyethyl)-2-tall-oil-2-imidazolinium chloride.

The corrosion inhibitor can comprise a bis-quaternized compound having the formula (III):

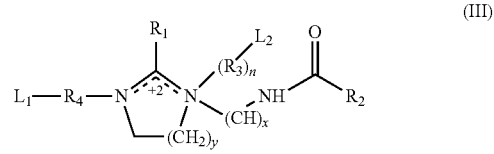

wherein $R_1$ and $R_2$ are each independently unsubstituted branched, chain or ring alkyl or alkenyl having from 1 to about 29 carbon atoms; partially or fully oxygenized, sulfurized, and/or phosphorylized branched, chain, or ring alkyl or alkenyl having from 1 to about 29 carbon atoms; or a combination thereof; $R_3$ and $R_4$ are each independently unsubstituted branched, chain or ring alkylene or alkenylene having from 1 to about 29 carbon atoms; partially or fully oxygenized, sulfurized, and/or phosphorylized branched, chain, or ring alkylene or alkenylene having from 1 to about 29 carbon atoms; or a combination thereof; $L_1$ and $L_2$ are each independently absent, H, —COOH, —SO$_3$H, —PO$_3$H$_2$, —COOR$_5$, —CONH$_2$, —CONHR$_5$, or —CON(R$_5$)$_2$; $R_5$ is each independently a branched or unbranched alkyl, aryl, alkylaryl, alkylheteroaryl, cycloalkyl, or heteroaryl group having from 1 to about 10 carbon atoms; n is 0 or 1, and when n is 0, $L_2$ is absent or H; x is from 1 to about 10; and y is from 1 to about 5. Preferably, $R_1$ and $R_2$ are each independently $C_6$-$C_{22}$ alkyl, $C_8$-$C_{20}$ alkyl, $C_{12}$-$C_{18}$ alkyl, $C_{16}$-$C_{18}$ alkyl, or a combination thereof; $R_3$ and $R_4$ are $C_1$-$C_{10}$ alkylene, $C_2$-$C_8$ alkylene, $C_2$-$C_6$ alkylene, or $C_2$-$C_3$ alkylene; n is 0 or 1; x is 2; y is 1; $R_3$ and $R_4$ are —C$_2$H$_2$—; $L_1$ is —COOH, —SO$_3$H, or —PO$_3$H$_2$; and $L_2$ is absent, H, —COOH, —SO$_3$H, or —PO$_3$H$_2$. For example, $R_1$ and $R_2$ can be derived from a mixture of tall oil fatty acids and are predominantly a mixture of $C_{17}H_{33}$ and $C_{17}H_{31}$ or can be $C_{16}$-$C_{18}$ alkyl; $R_3$ and $R_4$ can be $C_2$-$C_3$ alkylene such as —$C_2H_2$—; n is 1 and $L_2$ is —COOH or n is 0 and $L_2$ is absent or H; x is 2; y is 1; $R_3$ and $R_4$ are —$C_2H_2$—; and $L_1$ is —COOH.

It should be appreciated that the number of carbon atoms specified for each group of formula (III) refers to the main chain of carbon atoms and does not include carbon atoms that may be contributed by substituents.

The corrosion inhibitor can comprise a bis-quaternized imidazoline compound having the formula (III) wherein $R_1$ and $R_2$ are each independently $C_6$-$C_{22}$ alkyl, $C_8$-$C_{20}$ alkyl, $C_{12}$-$C_{18}$ alkyl, or $C_{16}$-$C_{18}$ alkyl or a combination thereof; $R_4$ is $C_1$-$C_{10}$ alkylene, $C_2$-$C_8$ alkylene, $C_2$-$C_6$ alkylene, or $C_2$-$C_3$ alkylene; x is 2; y is 1; n is 0; $L_1$ is —COOH, —$SO_3H$, or —$PO_3H_2$; and $L_2$ is absent or H. Preferably, a bis-quaternized compound has the formula (III) wherein $R_1$ and $R_2$ are each independently $C_{16}$-$C_{18}$ alkyl; $R_4$ is —$C_2H_2$—; x is 2; y is 1; n is 0; $L_1$ is —COOH, —$SO_3H$, or —$PO_3H_2$ and $L_2$ is absent or H.

The corrosion inhibitor can be a quaternary ammonium compound of Formula (IV):

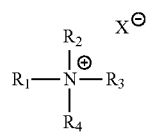

(IV)

wherein $R_1$, $R_2$, and $R_3$ are independently $C_1$ to $C_{20}$ alkyl, $R_4$ is methyl or benzyl, and $X^-$ is a halide or methosulfate.

Suitable alkyl, hydroxyalkyl, alkylaryl, arylalkyl or aryl amine quaternary salts include those alkylaryl, arylalkyl and aryl amine quaternary salts of the formula [$N^+R^{5a}R^{6a}R^{7a}R^{8a}$][$X^-$] wherein $R^{5a}$, $R^{6a}$, $R^{7a}$, and $R^{8a}$ contain one to 18 carbon atoms, and X is Cl, Br or I. For the quaternary salts, $R^{5a}$, $R^{6a}$, $R^{7a}$, and $R^{8a}$ can each be independently selected from the group consisting of alkyl (e.g., $C_1$-$C_{18}$ alkyl), hydroxyalkyl (e.g., $C_1$-$C_{18}$ hydroxyalkyl), and arylalkyl (e.g., benzyl). The mono or polycyclic aromatic amine salt with an alkyl or alkylaryl halide include salts of the formula [$N^+R^{5a}R^{6a}R^{7a}R^{8a}$][$X^-$] wherein $R^{5a}$, $R^{6a}$, $R^{7a}$, and $R^{8a}$ contain one to 18 carbon atoms and at least one aryl group, and X is Cl, Br or I.

Suitable quaternary ammonium salts include, but are not limited to, a tetramethyl ammonium salt, a tetraethyl ammonium salt, a tetrapropyl ammonium salt, a tetrabutyl ammonium salt, a tetrahexyl ammonium salt, a tetraoctyl ammonium salt, a benzyltrimethyl ammonium salt, a benzyltriethyl ammonium salt, a phenyltrimethyl ammonium salt, a phenyltriethyl ammonium salt, a cetyl benzyldimethyl ammonium salt, a hexadecyl trimethyl ammonium salt, a dimethyl alkyl benzyl quaternary ammonium salt, a monomethyl dialkyl benzyl quaternary ammonium salt, or a trialkyl benzyl quaternary ammonium salt, wherein the alkyl group has about 6 to about 24 carbon atoms, about 10 and about 18 carbon atoms, or about 12 to about 16 carbon atoms. The quaternary ammonium salt can be a benzyl trialkyl quaternary ammonium salt, a benzyl triethanolamine quaternary ammonium salt, or a benzyl dimethylaminoethanolamine quaternary ammonium salt.

The corrosion inhibitor can comprise a pyridinium salt such as those represented by Formula (V):

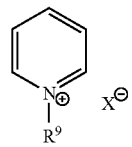

(V)

wherein $R^9$ is an alkyl group, an aryl group, or an arylalkyl group, wherein said alkyl groups have from 1 to about 18 carbon atoms and $X^-$ is a halide such as chloride, bromide, or iodide. Among these compounds are alkyl pyridinium salts and alkyl pyridinium benzyl quats. Exemplary compounds include methyl pyridinium chloride, ethyl pyridinium chloride, propyl pyridinium chloride, butyl pyridinium chloride, octyl pyridinium chloride, decyl pyridinium chloride, lauryl pyridinium chloride, cetyl pyridinium chloride, benzyl pyridinium chloride and an alkyl benzyl pyridinium chloride, preferably wherein the alkyl is a $C_1$-$C_6$ hydrocarbyl group. Preferably, the pyridinium compound includes benzyl pyridinium chloride.

The corrosion inhibitors can include additional corrosion inhibitors such as phosphate esters, monomeric or oligomeric fatty acids, or alkoxylated amines.

The corrosion inhibitor can comprise a phosphate ester. Suitable mono-, di- and tri-alkyl as well as alkylaryl phosphate esters and phosphate esters of mono, di, and triethanolamine typically contain between from 1 to about 18 carbon atoms. Preferred mono-, di- and trialkyl phosphate esters, alkylaryl or arylalkyl phosphate esters are those prepared by reacting a $C_3$-$C_{18}$ aliphatic alcohol with phosphorous pentoxide. The phosphate intermediate interchanges its ester groups with triethylphosphate producing a more broad distribution of alkyl phosphate esters.

Alternatively, the phosphate ester can be made by admixing with an alkyl diester, a mixture of low molecular weight alkyl alcohols or diols. The low molecular weight alkyl alcohols or diols preferably include $C_6$ to $C_{10}$ alcohols or diols. Further, phosphate esters of polyols and their salts containing one or more 2-hydroxyethyl groups, and hydroxylamine phosphate esters obtained by reacting polyphosphoric acid or phosphorus pentoxide with hydroxylamines such as diethanolamine or triethanolamine are preferred.

The corrosion inhibitor can include a monomeric or oligomeric fatty acid. Preferred monomeric or oligomeric fatty acids are $C_{14}$-$C_{22}$ saturated and unsaturated fatty acids as well as dimer, trimer and oligomer products obtained by polymerizing one or more of such fatty acids.

The corrosion inhibitor can comprise an alkoxylated amine. The alkoxylated amine can be an ethoxylated alkyl amine. The alkoxylated amine can be ethoxylated tallow amine.

Scale inhibitors include, but are not limited to, inorganic polyphosphates, organic phosphates, phosphate esters, organic phosphonates, organic amino phosphates, phosphoric acids, phosphonates, phosphonic acids, polyacrylamides, hydrophobically modified polyacrylamide, salts of acrylamidomethyl propane sulfonate/acrylic acid copolymer (AMPS/AA), phosphinated maleic copolymer (PHOS/MA), salts of a polymaleic acid/acrylic acid/acrylamidomethyl propane sulfonate terpolymer (PMA/AA/AMPS), organic polymers, sodium gluconate, and a combination thereof.

Foam inhibitors include, but are not limited to, polysiloxanes, polyvinylalkoxysilanes, polyvinylalkylalkoxy silanes, and a combination thereof.

Suitable emulsion breakers include, but are not limited to, dodecylbenzylsulfonic acid (DDBSA), the sodium salt of xylenesulfonic acid (NAXSA), epoxylated and propoxylated compounds, anionic cationic and nonionic surfactants, and resins, such as phenolic and epoxide resins.

Suitable gas hydrate inhibitors include, but are not limited to, thermodynamic hydrate inhibitors (THI), kinetic hydrate inhibitors (KHI), and anti-agglomerates (AA). Suitable thermodynamic hydrate inhibitors include, but are not limited to, sodium chloride, potassium chloride, calcium chloride, magnesium chloride, sodium bromide, formate brines (e.g. potassium formate), polyols (such as glucose, sucrose, fructose, maltose, lactose, gluconate, monoethylene glycol, diethylene glycol, triethylene glycol, mono-propylene glycol, dipropylene glycol, tripropylene glycols, tetrapropylene glycol, monobutylene glycol, dibutylene glycol, tributylene glycol, glycerol, diglycerol, triglycerol, and sugar alcohols (e.g. sorbitol, mannitol)), methanol, propanol, ethanol, glycol ethers (such as diethyleneglycol monomethylether, ethyleneglycol monobutylether), and alkyl or cyclic esters of alcohols (such as ethyl lactate, butyl lactate, methylethyl benzoate).

Suitable kinetic hydrate inhibitors and anti-agglomerates include, but are not limited to, polymers and copolymers, polysaccharides (such as hydroxyethylcellulose (HEC), carboxymethylcellulose (CMC), starch, starch derivatives, and xanthan), lactams (such as polyvinylcaprolactam, polyvinyl lactam), pyrrolidones (such as polyvinyl pyrrolidone of various molecular weights), surfactants (such as fatty acid salts, ethoxylated alcohols, propoxylated alcohols, sorbitan esters, ethoxylated sorbitan esters, polyglycerol esters of fatty acids, alkyl glucosides, alkyl polyglucosides, alkyl sulfates, alkyl sulfonates, alkyl ester sulfonates, alkyl aromatic sulfonates, alkyl betaine, alkyl amido betaines), hydrocarbon based dispersants (such as lignosulfonates, iminodisuccinates, polyaspartates), amino acids, and proteins.

Water clarifiers include, but are not limited to, inorganic metal salts such as alum, aluminum chloride, and aluminum chlorohydrate, or organic polymers such as acrylic acid based polymers, acrylamide based polymers, polymerized amines, alkanolamines, thiocarbamates, and cationic polymers such as diallyldimethylammonium chloride (DADMAC).

The system as described herein, can have the solid chemical comprise a water soluble polymer for enhanced oil recovery.

The system as described herein, can have the polymer for enhanced oil recovery is selected from the group consisting of polyacrylamide (PAM) and hydrophobically modified polyacrylamide (HM-PAM).

Use and application of the systems, apparatus, and methods disclosed herein provide advantages in the areas of dosage accuracy, efficiency, safety and costs related to materials, equipment and labor. These systems greatly reduce the need for shipping and storing large volumes of liquid chemicals, provides for a safer and more efficient and economical manner of oil well remediation than is possible with current methods. The fluidification and discharging of the chemical can be performed contemporaneously for as long as is required for sufficient dosing, reducing stoppages. The receptacle can be refilled with solid and/or high-viscosity liquid chemicals if needed. The valve regulated flow of both the chemical and solvent allows for controlled and accurate dosages, increasing accuracy and efficiency. The valve can further provide the user with current information regarding volumes discharged and volumes available. The targeted and continuous heating with concurrent discharge further provides economic benefit in that energy use is kept at a minimum, since only a portion of the receptacle is heated; and in that the user can fluidify only the volume of chemical to be injected in the immediate future. This significantly reduces energy requirements, as opposed to maintaining a whole receptacle of chemical constantly above its melting and/or fluidification temperature. If, after use, there remains unused chemical, since the chemical is in solid form, absent substantive solvent content, it can be safely stored in the receptacle, without waste or degradation of the chemical.

Disclosed herein are apparatus and methods for removing, reducing, and/or inhibiting foulant deposits in oilfield tubulars. Particularly, provided is a chemical injection apparatus used to fluidify solid and highly viscous liquid chemicals used as inhibitors (or any other type of oilfield chemical that can be manufactured as a solid and displays a melting point) on-site, mix said fluidified chemicals with a suitable solvent in a pre-determined ratio, and introduce the fluidified chemical into the flow of an oilfield tubular, wellhead and/or pipeline. Likewise, the chemical used in the present apparatus and methods for removing, reducing, and/or inhibiting foulant deposits in oilfield tubulars can be a high-viscosity liquid chemical. Specific methods and materials are described herein, although methods and materials similar or equivalent to those described herein can be used in practice or testing of the present systems and methods.

Fluidification Device

The chemical injection apparatus is constructed and adapted to be substantially self-contained and optionally portable, such that: it can be positioned at the site of application, immediately adjacent to a chemical injection point, and fluidly connected to an injection point of a production line; and it comprises a fluidification device that enables a user to melt a solid chemical or heat a highly viscous liquid chemical and controllably direct the fluidified chemical into a mixing chamber for mixing with a solvent in a continuous manner.

The fluidification device comprises: a receptacle; a pressure component operably connected to the receptacle; a heating component adapted and positioned for heating a portion of the receptacle; a discharge valve positioned downstream of the receptacle; and a discharge heating component adapted and positioned for heating a conduit portion downstream of the receptacle. The components of the fluidification device can be interconnected and contained in a frame assembly, such as a skid, providing a self-contained unit. The skid can be constructed and arranged in a conventional manner. The skid frame assembly can be a polymer (plastic), wood or metal platform and/or the frame and can be supported on wheels, legs, or runners used for handling and moving various apparatus.

Referring now to FIG. 1, there is shown a fluidification device 100 comprising a receptacle 122 having a body wall defining an open interior volume adapted to receive and hold an amount of a solid or highly viscous liquid chemical 136 and a pressure component 120 connectable and/or connected to the receptacle 122 and adapted to pressurize the receptacle and/or apply physical pressure to the solid or highly viscous liquid chemical 136 and/or the fluidified chemical 138.

The receptacle 122 further includes an inlet 124, an outlet 126 defining a distal or downstream end of the receptacle 122, a proximal body portion 123 defining a first open interior portion 127 comprising a first volume of the open interior volume and a distal body portion 125 defining a second open interior portion 129 comprising a second volume of the open interior volume. The second open interior portion 129 being in fluid communication with and between the first open interior portion 127 and the outlet 126. The first and second interior portions 127 and 129 can form the open interior volume of the receptacle 122. The receptacle can be adapted for receiving the solid chemical 136 through the inlet 124 and into the first and second open interior portions 127 and 129. Loaded solid or highly viscous liquid chemicals 136 can be held and stored for later use, or prepared for immediate use.

The fluidification device 100 includes an outlet conduit 128 in fluid communication with and extending distally (downstream) from the outlet 126. The fluidification device 100 can further comprise a heating component 130 adjacent to the outlet 126. The heating component 130 is further proximate to at least a portion of the outlet conduit 128 and at least a portion of the distal body portion 125. The proximity of the heating component 130 to the distal body portion 125 being such that, when the heating component 130 is heated, thermal energy is targeted at and increases the temperature of the outlet 126 and the distal body portion 125, thereby heating the second open interior portion 129 and any solid or highly viscous liquid chemical 136 held therein.

The heating component 130 is positioned and adapted to emit enough heat so as to fluidify chemical 136 held in the receptacle 122 adjacent to the outlet 126 and at least a portion of the second open interior portion 129 of the distal body portion 125. The heating of the chemical 136 converts the chemical to a fluidified state (molten, melted, or liquid chemical 138). The heating is targeted at the outlet 126 and at least a portion of the distal body portion 125, such that there is a substantive temperature difference between at least a portion of the proximal body portion 123 and at least a portion of the distal body portion 125. The difference in temperature is such that, during operation and active flow of chemical through the outlet conduit 128, loaded chemical positioned in at least a portion of the first open interior portion 127 can be in a solid or highly viscous liquid state 136 while chemical positioned in at least a portion of the second open interior portion 129 can be in a fluidified state 138.

The targeted heating of the receptacle contents and the temperature difference is such that, during operation and active flow of chemical through the outlet conduit 128, chemical in a fluidified state 138 represents less than about 90% of total chemical (136 and 138) in the receptacle 122. The heating of the receptacle can be such that the fluidified chemical represents less than about 60% of the total chemical in the receptacle.

The outlet conduit 128 extends distally from the outlet 126 to a downstream end of the outlet conduit 128. The outlet conduit 128 is in close proximity to, and optionally in contact with, a discharge heating component 132 downstream of and running from the heating component 130. The discharge heating component 132 can be used to prevent the fluidified chemical from solidifying before being introduced into the remainder of the chemical injection apparatus.

The system 100 can further comprise a valve 134 at and in fluid communication with the downstream end of the outlet conduit 128. Valve 134 can alternatively be referred to in other portions of this application as a solid chemical metering valve. The valve 134 is further connected to and in fluid communication with the remainder of the chemical injection apparatus shown in FIG. 2. For example, the valve 134 can be in fluid communication with a heat-traced three way valve.

In use, the receptacle is loaded with a solid chemical 136 through the inlet 124 and into the first open interior portion 127 of the proximal body portion 123. The inlet 124 can have a seal (not shown) that closes the inlet 124, allowing the first and second open interior portions, 127 and 129, to be pressurized. The inlet 124 can be connected to a remote source of solid chemical 136 via a feeding conduit.

Loaded solid chemical 136 settles in the second open interior portion 129 and is converted into a fluidified chemical 138 by setting the heating component 130 above the melting point of the solid chemical 136. The outlet 126 and at least a portion of the distal body portion 125 are thereby heated. Optionally, the receptacle 122 is pressurized by the pressure component 120, if necessary, to drive the molten chemical through the outlet conduit 128, to the valve 134. The valve 134 can be adapted to control the flow of the fluidified chemical to the remainder of the chemical injection apparatus.

While the example shown in FIG. 1 illustrates a compact fluidification device, those of skill in the art will appreciate that the fluidification device can be modified and adapted to include further configurations and features not shown that are included within the scope of the present disclosure. Among other features, the receptacle can have any configuration that is operable for the method including the optional component of a mechanical handling device for controlling the flow of chemical from the first volume to the second volume. Further, the apparatus can be adapted with or connected to a feed conduit or extension which is operably connectable to the inlet 124 for filling the receptacle from a remote source of solid chemical; and/or the outlet conduit 128 can be lengthened or adapted with a heated extension conduit, so as to allow easy filling and optimum discharge of the molten chemical to the remainder of the chemical injection apparatus.

Similarly, those of skill in the art will appreciate that heating component 130 can be additionally or alternatively located adjacent to a portion of the distal body portion 125 of the receptacle 122 and/or the discharge heating component can extend along portions of the outlet conduit 128 and run distally from the heating component 130 to an extent necessary to accommodate any particular environmental, chemical, geographic, design or physical constraints or requirements.

In addition, it should be noted that the valve 134 can also comprise a flow controller. In use, valve 134 can be any appropriate valve, such as a metering valve or flow controller, for controlling the flow of and/or accurately measuring the amount of fluidified chemical (such as, for example, paraffin inhibitor, asphaltene inhibitor or the like) directed to the remainder of the chemical injection apparatus. Those of skill in the art will also appreciate that; while a pressure component 120 can be desirable, it can be unnecessary in some cases, depending on the particular application required. Gravity and/or a downstream device applying negative pressure (vacuum) can be used to maintain flow through the system.

The pressure component 120 can be adapted to comprise a valve, for example a metering valve, in addition to, or instead of, valve 134 downstream. Such a valve incorporated into the pressure component can be adapted to control or meter applied pressure within the receptacle used in driving the solid chemical into and through the heated portion of the receptacle. The heated portion of the receptacle can be the second open interior portion 129.

Alternatively, the system can comprise a chemical that is a high viscosity liquid where the high viscosity liquid chemical agent is a composition having from about 0.1 vol. % to about 30 vol. % solvent.

The fluidification device used with a high viscosity liquid chemical can comprise (i) a receptacle including an inlet; an outlet; and a wall extending between the inlet and outlet and defining an open interior volume, the open interior volume being in fluid communication with the inlet and outlet and comprising a first volume and a second volume, wherein the second volume is between the outlet and the first volume, and wherein the receptacle optionally includes a mechanical handling device for controlling the flow of chemical from the first volume to the second volume; (ii) a heating component adapted to emit heat, positioned adjacent to the outlet and separated from a majority volume of the open interior volume and a majority portion of the wall, wherein the majority volume and majority portion extend away from the heating component, such that only a portion of the majority volume and a portion of the majority portion are oriented toward the heating component; (iii) an outlet conduit connected to the outlet at a first end and being adapted for operable connection to the remainder of the chemical injection apparatus at a second end; (iv) a pressure component, the pressure component operably connected to the receptacle and adapted to apply pressure on at least a portion of the chemical in the open interior volume; and (v) a valve adapted for enabling discharge of fluidified high viscosity liquid chemical into the remainder of the chemical injection apparatus in predetermined doses. In operation with a high viscosity liquid chemical loaded in the open interior volume, actuation of the heating component heats the second volume to a temperature above which the high viscosity liquid chemical easily flows (e.g., having a kinematic viscosity of less than about 1000 cSt when measured at 25° C.), thereby significantly lowering the viscosity of the liquid chemical positioned in the second volume without substantive change in the viscosity of the high viscosity liquid chemical positioned in the first volume. The pressure component applies pressure on at least a portion of chemical in the receptacle and fluidified high viscosity liquid chemical flows from the receptacle, through the outlet conduit and into the remainder of the chemical injection apparatus, allowing high viscosity liquid chemical in the first volume to move toward the second volume, and wherein, at a point in time during discharging, the portion of the fluidified high viscosity liquid chemical represents less than 90% of total chemical in the receptacle.

This system can further comprise a discharge conduit and a discharge heating component adapted for preventing increase in the viscosity of the fluidified liquid chemical within the discharge conduit, the discharge conduit operably connected to the valve at a first end and adapted for operable connection to the remainder of the chemical injection apparatus at a second end.

The system can fluidify the high viscosity liquid chemical by heating the high viscosity liquid chemical in the second volume to a temperature in the range of about 30° C. to about 200° C. The system can, at a point in time during discharging, have the portion of the fluidified high viscosity liquid chemical represents less than about 60% of total chemical in the receptacle.

Receptacle

The receptacle can be used for storage of the chemical in its solid or high viscosity liquid phase prior to fluidification and mixing with a solvent and injection into the tubular, pipeline, wellhead, etc. The receptacle in down-time and in use can be exposed to local ambient temperature. In use, although exposed to such ambient temperature, the portion of the receptacle (primarily the outlet of the receptacle) immediately adjacent to or targeted by the heating component will be warmed by conduction, fluidifying the chemical added to the receptacle.

The receptacle can be made from various materials. The material or combination of materials used can complement the heating of solid chemical in the distal open interior portion. Examples of such materials include metals, metal alloys, polymers, glasses, ceramics or mixtures thereof. The material of the receptacle adjacent to the distal open interior portion (intended heating zone) can be conductive material. The conductive material can be combined with less conductive material, such as polymer material, used for portions of the receptacle less proximal to the intended heating zone.

The receptacle can be a tank. The tank can have various capacities, including, but not limited to, about 5 L, about 100 L, about 1,000 L, about 5,000 L, about 10,000 L, about 50,000, about 1 L to about 100 L, about 100 L to about 1,000 L, and about 1,000 L to about 50,000 L. The receptacle can be a hopper or barrel of an extruder, or the like, and the system described herein can be incorporated into an extruder device.

Heating Component:

The heating component is positioned adjacent to or in contact with at least a portion of the receptacle outlet and/or a lower portion of the receptacle. The positioning is sufficiently proximate to the loaded solid chemical so as to melt the solid chemical to liquid or molten state.

When powered or engaged, the heating component increases the temperature adjacent to the loaded solid chemical to a level consistent with the melting temperature of the solid chemical, regardless of ambient temperature. The heat melts the solid chemical located at the bottom of the receptacle adjacent to the outlet. The melted chemical can then flow, under pressure if necessary, downstream towards valve 134.

Additional heating components can also be supplied to provide heat to various conduits and parts of the apparatus downstream of the heating component. The heating components can be any component capable of emitting thermal energy that maintains the temperature of the chemical above its melting point.

The additional heating components can provide heat to all or portions of the outlets, discharge conduits, and/or solid chemical metering valve, if necessary. The heating components can comprise a component adjacent to or in contact with the conduits and/or valves that emits thermal energy. For example, the heating components can comprise a heat trace tape or line, a heated sleeve or jacket, or an electric element. Examples of energy sources for the heating components include, but are not limited to, gas, steam, microwave or any other usable source of thermal energy.

The heating component is a component that emits thermal energy. The heating component is adapted to enable heating of at least a portion of the distal open interior portion to a temperature in the range from about 80° C. to about 200° C., from about 80° C. to about 180° C., from about 80° C. to about 160° C., from about 80° C. to about 150° C., from about 100° C. to about 200° C., from about 100° C. to about 180° C., or from about 100° C. to about 160° C., from about 100° C. to about 150° C. The heating component is adapted to enable heating of at least a portion of the distal open interior portion to a temperature exceeding about 100° C.

The heating component comprises an electric element, a heat trace tape or line, or a heated sleeve or jacket. Examples of energy sources for the heating component include, but are not limited to, gas, steam, microwave or any other usable source of thermal energy.

Pressure Component:

The pressure component applies pressure to at least a portion of the chemical and the overall system resulting in a pressure at the injection point superior to that of the production line.

The pressure component can be a pump, a compressor, a high pressure gas cylinder, a pneumatic piston, a fluidic piston, an electromagnetic piston, a screw, or any other device able to apply pressure. The pressure component is not necessarily comprised of a single element and could be composed of various components as well as lubricating and/or compression fluids. The pressure component is not necessarily confined to the section of the system directly upstream of the receptacle and can extend to various other sections, such as the receptacle itself for instance. The pressure component can be constructed and arranged to apply pressure upon the solid chemical, liquid/melted chemical or both so as to effectuate transfer of the chemical to the remainder of the system and/or the injection point.

Valve:

The valve, for example a solid chemical metering valve, is a device or portion adapted for halting or controlling the flow of chemical from the fluidification device. The valve enables the fluidified chemical to be directed into the remainder of the chemical injection apparatus at an accurate dosage that can be adjusted as desired. The valve is maintained at a temperature above the melting point of the chemical by heat tracing or other suitable means.

The valve can be any appropriate valve including a metering valve or flow control valve. The valve can be manual or automatic such as for example, a pneumatic valve, a solenoid valve, or a hydraulic valve.

A metering valve can be placed downstream of the heating element. Optionally, direction of the fluidified chemical into the remainder of the chemical injection apparatus can be controlled using a metering device positioned upstream of the heating element and a valve positioned downstream, such as a check valve.

A metering valve can be placed at or immediately adjacent to the injection point to reduce the overall pressure drop between the receptacle and the injection point. The valve component is preferably positioned upstream of a heat-traced line.

Two or more valves can be included, located at varying positions in the system to control flow and provide sensor information regarding flow rates, volumes, etc. A metering device can be incorporated in the fluid line and combined in use with a valve that is incorporated in the fluid line and/or a check valve on the production line.

A metering valve can be part of or incorporated into the pressure component. Where the pressure component is a physical pressure component, the metering valve controls or monitors the pressure component as it physically drives solid chemical into the heating section of the reservoir and through the system. Where the pressure component is a fluid/gas pressurization system, the metering valve controls or monitors the pressure component as it pressurizes the receptacle, driving chemical into the heating section of the reservoir and through the system.

Chemical Injection Apparatus

After the solid chemical or high viscosity liquid chemical is fluidified in the fluidification device (both chemicals hereinafter referenced as the "fluidified chemical"), the fluidified chemical is directed to the remainder of the chemical injection apparatus.

The apparatus can comprise a solvent metering valve for controlled release of the fluidified chemical. The apparatus also can comprise a heat-traced three way valve for directing the fluidified chemical to the heat-traced mixing chamber and/or to the chemical injection point. The apparatus further comprises a solvent tank wherein solvent is pumped from the solvent tank through a solvent metering valve, for controlled release of the solvent, and into the heat-traced mixing chamber. In the heat-traced mixing chamber the fluidified chemical and solvent are mixed in a pre-determined amount thereby creating a diluted fluidified chemical. The diluted fluidified chemical is then directed to the chemical injection point. The chemical injection point provides access to an oilfield fluid stream wherein the diluted fluidified chemical is introduced into a well head, oilfield tubular, pipeline, or the like.

Some or all of the valves, lines, chambers, tanks, etc. are heat-traced in order to maintain the temperature of the contents of the valve, line, chamber, tank, etc. above the melting point of said contents, in order to ensure adequate flow through all process equipment.

Figure 2:
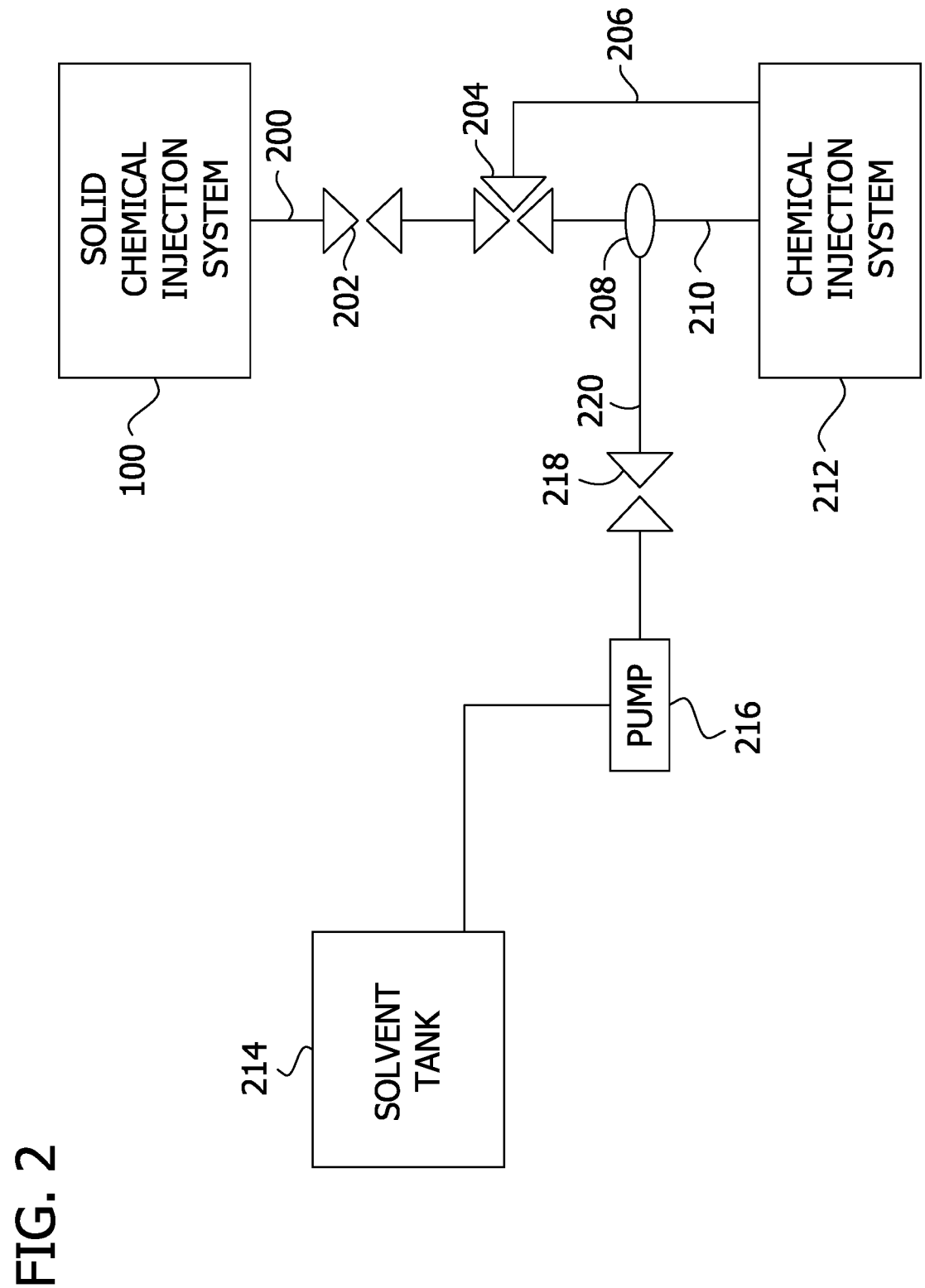
FIG. 2 is a system schematic of the solid or high viscosity liquid chemical injection system wherein fluidified chemical and solvent are mixed prior to injection.

Referring to FIG. 2, fluidification device 100 is shown in relation to the overall system. Pipe 200, which can also be referenced as the discharge heating component 132 of FIG. 1, allows the fluidified chemical to be passed from the fluidification device. Flow rate of the fluidified chemical can then be controlled by solid chemical metering valve 202, alternatively referenced as valve 134 of FIG. 1. After passing through solid chemical metering valve 202, the fluidified chemical is directed to heat-traced three way valve 204. A portion of the fluidified chemical can be directed from valve 204 directly to chemical injection point 212, via heat-traced line 206. Some or all of the fluidified chemical can be directed from the heat-traced three way valve 204 to heat-traced mixing chamber 208. Meanwhile, solvent for dilution of the chemical is stored on-site in solvent tank 214. Preferably, the solvent tank is located near the chemical injection point. For example, the solvent tank can be located on the chemical injection apparatus skid mentioned previously. Solvent is directed from solvent tank 214 to solvent metering valve 218 via solvent pump 216. Solvent metering valve 218 controls the flow rate of solvent such that the chemical is diluted to a pre-determined amount. The solvent is directed to heat-traced mixing chamber 208 via heat-traced solvent line 220. The fluidified chemical and solvent are mixed in heat-traced mixing chamber 208 to ensure that a homogeneous diluted fluidified chemical is produced. The diluted fluidified chemical is then removed from heat-traced mixing chamber 208 via heat-traced line 210, and is directed to chemical injection point 212. Chemical injection point 212 provides access to an oilfield fluid stream where the diluted fluidified chemical is introduced into a well head, oilfield tubular, pipeline, or the like.

Solid Chemical Size Reduction

The solid chemical can be reduced in size by a solid chemical size reduction apparatus, as opposed to being fluidified. The solid chemical size reduction apparatus can comprise various mechanical and/or non-mechanical means for reducing the size of the solid chemical. For example, the solid chemical size reduction apparatus can comprise an impact crusher, a pulverizer, a pin mill, a stud mill, a cage mill, a hammer mill, a ball mill, a rod mill, a cone mill, a disc mill, a turbo mill, a counter-rotating mill, a beater mill, a tooth disc mill, a mechanical impact mill, a jet mill, an attrition mill, a granulator, a grinder, or a combinations thereof.

The solid chemical size reduction apparatus can comprise a blade, a shank, a knife edge, or a combination thereof.

The solid chemical size reduction apparatus can reduce the solid chemical to a powder (i.e. having an average particle diameter no greater than about 100 microns, no greater than about 500 microns, or no greater than about 1 millimeter).

The solid chemical size reduction apparatus can produce size-reduced solid chemicals having an average particle diameter of about 1 micron, about 10 microns, about 100 microns, about 1 millimeter, about 2 millimeters, or about 5 millimeters. The solid chemical size reduction apparatus can produce size-reduced solid chemicals having an average particle diameter between about 1 micron and about 10 millimeters, between about 1 micron and about 5 millimeters, between about 1 micron and about 2 millimeters, between about 1 micron and about 1 millimeter, between about 1 micron and about 500 microns, between about 1 micron and about 100 microns, between about 10 microns and about 10 millimeters, between about 10 microns and about 5 millimeters, between about 10 microns and about 2 millimeters, between about 10 microns and about 1 millimeter, between about 10 microns and about 500 microns, between about 10 microns and about 100 microns, or between about 10 micron and about 50 microns.

The size-reduced solid chemical is reduced in size such that it is flowable through a pipe. The size-reduced solid chemical is then directed through a chemical metering valve to a 3-way valve. The size-reduced solid chemical is directed through the 3-way valve to a heat-traced mixing chamber. Optionally, a portion of the size-reduced solid chemical can be directed from the 3-way valve to an oilfield fluid stream.

A solvent is pumped from a solvent tank, through a solvent metering valve, and into the heat-traced mixing chamber via one or more heat-traced solvent line(s). In the heat-traced mixing chamber the size-reduced solid chemical and solvent are mixed in a pre-determined amount thereby creating a diluted size-reduced solid chemical. The diluted size-reduced solid chemical is then directed to the chemical injection point. The chemical injection point provides access to an oilfield fluid stream wherein the diluted size-reduced solid chemical is introduced into a well head, oilfield tubular, pipeline, or the like.

Solvent

The solvent utilized can be any solvent suitable for dilution of the chemical and use in an oilfield fluid stream. Preferably, the solvent is such that the diluted chemical formed by mixing the solvent and chemical in the heat traced mixing chamber is a homogeneous mixture.

For example, the solvent of the present process can be selected from the group consisting of heavy aromatic naphtha, toluene, xylene, diesel, kerosene, isopropanol, methanol, water and a mixture thereof.

Solvent Tank

The solvent tank can be made from various materials. The material or combination of materials used can complement the flow of solvent from the solvent tank. Examples of such materials include metals, metal alloys, polymers, glasses, ceramics, or a mixture thereof. The material of the solvent tank can be conductive material. The conductive material can be combined with less conductive material, such as polymer material.

The solvent tank can have various capacities, including, but not limited to, about 5 L, about 100 L, about 1,000 L, about 5,000 L, about 10,000 L, about 50,000 L, about 1 L to about 100 L, about 100 L to about 1,000 L, or about 1,000 L to about 50,000 L.

As necessary, the solvent tank can be heat traced in order to maintain the solvent above the melting point of the particular solvent used. The various components utilized in discharging solvent from the solvent tank can also be heat traced in order to maintain the solvent above its melting point.

Pump

One or more pumps can be used throughout the system disclosed herein. The pump can be any suitable pressure component including a pump, a compressor, a high pressure gas cylinder, a hydraulic pump, a mechanically driven piston, a pneumatic piston, a fluidic piston, a screw, an electromagnetic piston, or any other suitable means of applying pressure.

Mixing Chamber

The heat-traced mixing chamber can be made from various materials. The material or combination of materials used can complement the mixing of solvent and chemical. Examples of such materials include metals, metal alloys, polymers, glasses, ceramics, or a mixture thereof. The material of the heat-traced mixing chamber can be conductive material. The conductive material can be combined with less conductive material, such as polymer material.

The heat-traced mixing chamber can have various capacities, including, but not limited to, about 5 L, about 100 L, about 1,000 L, about 5,000 L, about 10,000 L, about 50,000, about 1 L to about 100 L, about 100 L to about 1000 L, or about 1,000 L to about 50,000 L.

The various components utilized in discharging diluted chemical from the heat-traced mixing chamber can be heat traced in order to maintain the diluted chemical above its melting point.

Chemical

The chemical or chemical package is a product introduced into tubular systems and/or surface equipment of oilfields for preventing, inhibiting and/or decreasing inline foulant/contaminant precipitation and/or deposition. The chemical is manufactured as a solid, examples of which include, but are not limited to, flakes, pellets and sticks. Examples of suitable solid chemicals include those that can be transported and stored, including in the receptacle, in solid phase at ambient temperature and pressures (approximately 20° C. and 1 atm). The solid chemical can also comprise a high viscosity liquid. A "high viscosity liquid" as defined herein is a liquid having a kinematic viscosity of greater than about 1000 cSt when measured at 25° C. Examples further include chemicals having a melting point below its decomposition temperature at the pressure found inside the receptacle.

The solid or highly viscous liquid chemical can comprise a paraffin inhibitor. Suitable examples of paraffin inhibitors are described above.

The solid or highly viscous liquid chemical can comprise an asphaltene inhibitor, suitable examples of which are described above.

The solid or highly viscous liquid chemical can comprise a scale inhibitor, suitable examples of which are described above.

The solid or highly viscous liquid chemical can comprise a corrosion inhibitor, suitable examples of which are described above.

When the chemical is a high viscosity liquid chemical, the chemical can comprise a concentrated solution of the desired chemical.

Those of skill in the art will appreciate that the problem of deposition of contaminants and/or foulants (e.g., paraffin, asphaltene, scale, etc.) occurs not only within tubulars and pipelines but also in production equipment, valves, fittings, and the wellbore itself. As such, the exact location of the injection point of the use of methods and systems can be anywhere that is prone to foulant/contaminant buildup depending on the particular operating conditions of any specific well, the composition of particular crude or condensate, as well as the refinery oil's source and process design. Those of skill in the art will also appreciate that the solid chemical can be any solid chemical which is adaptable to the method and which can be useful in oil extraction, oilfield production and refinery processes, such as paraffin inhibitors, asphaltene inhibitors, corrosion inhibitors, salt inhibitors, scale inhibitors, gas hydrate inhibitors, and the like.

In use, the systems and methods use solid chemistry that is automatically stable at least to about −40° C. with an upper range of stability of at least about 60° C. Stability is understood to mean that no significant phase separation occurs at a given temperature. As the chemical is solid, the chemical can be stored over longer periods of time without volatile solvents and maintain stability. The solid chemical used can comprise less than about 15% solvent. Mixing with a solvent occurs directly before injection of the diluted fluidified chemical into the oilfield fluid stream.

In use, the chemical is deposited into the receptacle as a solid, where it can be stored until application. The solid chemical is fed, under pressure if necessary, into the heating element section of the system by gravity, an auger, or any other suitable means. The heated section of the system fluidifies the chemical. The fluidified chemical is then introduced into the remainder of the chemical injection apparatus at a rate dictated by the valve (e.g., a metering valve or flow controller).

The present system comprises a chemical delivery unit for on-site fluidification of a solid chemical, mixing of the fluidified solid chemical with a solvent on-site, and injection of the diluted fluidified solid chemical into the production stream of a production or transmission line for inhibiting precipitation contaminants and/or foulants. The chemical delivery unit comprises: i) a frame assembly; ii) a receptacle portion fixed to the frame assembly, the receptacle portion being adapted to contain solid chemical and be pressurized and/or able to apply physical pressure; iii) a heating zone in fluid communication with the receptacle portion; iv) a discharge port fixed to the receptacle portion downstream and in fluid communication with a heat-traced three way valve; (v) a heat-traced three way valve wherein a portion of the fluidified solid chemical is optionally directed to a chemical injection point or wherein the fluidified solid chemical is directed to a heat-traced mixing chamber; (vi) a solvent tank comprising solvent wherein the solvent is pumped through a solvent metering valve to the heat-traced mixing chamber; (vii) a heat-traced mixing chamber wherein the fluidified solid chemical and solvent are mixed to the desired proportion to produce a diluted fluidified solid chemical; and (viii) a chemical injection point adapted for enabling discharge of diluted fluidified solid chemical into the oilfield fluid stream in predetermined doses. The chemical delivery unit is adapted to enable a user to portably move the chemical delivery unit into a position adjacent and releaseably operably couple it to a tubular, providing fluid communication between the chemical delivery unit and the production stream; and, in a continuous manner, convert an amount of chemicals in solid state being held in the receptacle portion to fluid state chemicals by exposure to the heating zone, mix the fluidified solid chemical with a solvent, and inject the diluted fluid state chemicals under pressure through the discharge port, into the production stream.

The chemical delivery unit can further comprise a valve positioned downstream of the heating zone, enabling flow of the fluidified solid chemical in predetermined doses to the remainder of the chemical delivery unit. The unit can further comprise a heat trace line in fluid communication with and positioned between the receptacle portion and the remainder of the chemical delivery unit The chemical delivery unit can further comprise a pressure system adapted for pressurizing the receptacle portion or applying physical pressure to receptacle contents. The heat zone can comprise a heating element for heating a portion of the receptacle portion and converting the loaded solid state chemical to fluid state.

The present system comprises a chemical injection apparatus (unit-assembly) for on-site fluidification (heating/melting), mixing with a solvent (diluting), and injecting (delivering) a high-viscosity liquid chemical into the production stream of a production or transmission line of an oilfield for inhibiting precipitation/deposition foulants in the production and/or transmission line. The chemical injection apparatus comprises: a frame assembly; a receptacle portion fixed to the frame assembly, the receptacle portion being adapted to be pressurized and/or apply physical pressure; a heating zone fixed to the frame assembly and in fluid communication with the receptacle portion; and a receptacle discharge port downstream and in fluid communication with the receptacle portion and the heating zone; a mixing chamber; and an injection zone. The chemical injection apparatus is adapted to be portably moved into a position adjacent and releaseably operably coupled to a tubular containing the production stream, providing fluid communication between the discharge port and the production stream; and, in a continuous manner, to fluidify, dilute, and inject, under pressure, an amount of solid chemicals loaded in the receptacle portion, into the production stream.

The present system further comprises a self-contained unit for fluidifying, diluting, and introducing a solid phase chemical package formulated for inhibiting precipitation/deposition foulants into oilfield production or transmission lines. The self-contained unit comprises a frame assembly containing therein: a fluidification portion, the fluidification portion being adapted to be pressurized and/or apply physical pressure and configured to receive the solid phase chemical package to be fluidified therein; a mixing chamber for diluting the fluidified solid chemical package with a solvent; an injection path for injecting the chemical package in liquid phase after fluidification; and a discharge port adapted to be sealingly and releasably operably coupled to a tubular containing the production stream of an oilfield production or transmission line. The self-contained unit can be adapted to be portable.

The present system further comprises a chemical additive injection kit. The chemical additive injection kit comprises: a chemical injection unit comprising: a frame assembly; a receptacle portion adapted for receiving a solid phase chemical package and for pressurization or the application of pressure on at least a portion of receptacle contents; a fluidification/size reduction portion, the fluidification/size reduction portion being adapted to fluidify/reduce the size of the solid phase chemical package; a mixing portion, the mixing portion being adapted for mixing the chemical package and a solvent; an injection path for injecting the chemical package in liquid phase after mixing; and a discharge port adapted to be sealingly and releasably coupled to a tubular containing the production stream of an oilfield production or transmission line. The chemical injection unit, when assembled, is adapted to be used with a chemical package in solid state formulated for inhibiting precipitation/deposition foulants in the production and/or transmission line. The chemical injection unit further comprises instructions for using the chemical injection unit in inhibiting precipitation/deposition foulants in oilfield production and/or transmission lines with said chemical injection unit and chemical package.

The chemical additive injection kit comprise instructions to load a solid chemical package into the receptacle portion, melt the chemical package in the heating portion or reduce the chemical package size in a size reduction portion, mix the melted/size-reduced chemical package with a solvent in the mixing portion, and inject an effective amount of the chemical package, under pressure, through the discharge port, into the production stream of an oilfield production or transmission line to inhibit precipitation of foulants and/or contaminants.

The present disclosure comprises a commercial package. The commercial package comprises: a solid chemical comprising an oilfield production additive for introduction into a tubular flow; and labeling having printed instructions indicating the use thereof as a precipitation/deposition foulant inhibitor for an oilfield production or transmission line. The commercial package further comprises instructions for use.

The commercial package comprises: a paraffin inhibitor, an asphaltene inhibitor, a corrosion inhibitor, a scale inhibitor, a foam inhibitor, or a combination thereof.

The present disclosure is also directed to a method of marketing a solid chemical, comprising packaging the solid chemical along with labeling that identifies solid chemical as being useful to inhibit precipitation of foulants and/or contaminants, such as described herein, in oilfield production or transmission lines or surface equipment.

The present disclosure is directed to methods of treating (conditioning) oilfield tubulars for negative effects associated with foulants and/or contaminants using a solid chemical as an injectable for inhibiting, decreasing, or preventing precipitation and/or deposition of solids and contaminants in the oilfield tubulars using the systems or apparatus described herein.

The present disclosure further includes use of the chemical injection system disclosed herein in various other industrial processes requiring chemical injection. Such processes include, but are not limited to, the use and methods of using the chemical injection system disclosed herein for chemical injection in paper manufacturing, water treatment, crude oil refining, and the petrochemical industry.

Any patents or publications referenced in this disclosure are herein incorporated to the extent they describe the chemicals, materials, instruments, statistical analyses, and methodologies which are reported in the patents and publications which might be used in connection with the invention or which can expand the understanding and scope of the embodiments and claims of the presently disclosed invention. Referenced and incorporated patents and applications include:

| U.S. Pat. No. | U.S. Pat. No. | U.S. Pat. No. | U.S. Pat. No. |
|---|---|---|---|
| 7,857,871 | 7,670,993 | 7,541,315 | 7,493,955 |
| U.S. Pat. No. | U.S. Pat. No. | U.S. Pat. No. | U.S. Pat. No. |
| 7,455,111 | 6,491,824 | 6,111,261 | 4,518,509 |
| U.S. Pat. No. 9,574,981 | | Chinese patent no. 1487048 Titled: Solid wax resisting scale inhibitor for well | |

All references cited in this specification are to be taken as indicative of the level of skill in the art. Nothing herein is to be construed as an admission that the invention is not entitled to antedate such disclosure by virtue of prior invention.

Unless otherwise defined herein, all technical and scientific terms used herein have the same meaning as commonly understood by one of ordinary skill in the art. In case of conflict, the present document, including definitions, will control. The following definitions are provided to determine how terms used in this application are to be construed. The organization of the definitions is for convenience only and is not intended to limit any of the definitions to any particular category.

"Flow line" as used herein refers to the surface pipe through which oil or gas travels from a well to processing equipment or to storage.

"Inhibitor/dispersant" as used herein refers to a chemical or composition that prevents or reduces contaminant precipitation from a crude oil and/or deposition of contaminants or foulants on surfaces in contact with a crude oil, or a chemical used to help in the removal of a contaminant or foulant deposit already formed on a surface.

"Deposition" as used herein refers to the coating of agglomerated materials on the surface of a material, such as an interior wall of a pipe or tubing.

"Introducing" as used in the context of introducing a chemical into a production stream means inserting, adding or injecting the chemical into the flow inside a tubular of an oilfield tubular. Introducing can include injecting under pressure or allowing the chemical to be added to the tubular by mass flow of oil.

"Precipitation" as used herein refers to the agglomeration of solids which can remain suspended in the bulk fluid fraction, or settle down by gravity, but do not physically attach to any surface.

"Skid" as used herein refers to a wood, polymer (plastic), or metal platform and/or frame sometimes supported on wheels, legs, or runners used for handling and moving various apparatus.

"Tubular" or "Tubulars" as used herein refers to any type of oilfield pipe or oilfield tubular goods, such as drill pipe, drill collars, pup joints, casing, production tubing/line and pipeline or line pipe. The term includes standard and line pipe used in the oil and gas, pipeline, construction, refining, chemical and petrochemical industries for production and transmission of crude oil, natural gas and petroleum products as well as for water and slurry pipeline applications.

"Oilfield" as used herein refers to the surface area overlying an oil reservoir or reservoirs, and the reservoir(s), well(s) and production equipment associated therewith.

"Pipeline" as used herein refers to a tube or system of tubes used for transporting crude oil and natural gas from the field or gathering system to the refinery.

"Production" refers to the phase of the petroleum industry that deals with bringing well fluids or gas to the surface and separating them and storing, gauging and otherwise preparing the product for delivery; also can refer to the amount of oil or gas produced in a given period.

"Production tubing" as used herein refers to a wellbore tubular used to produce reservoir fluids. Production tubing is assembled with other completion components to make up the production string. The production tubing selected for any completion should be compatible with the wellbore geometry, reservoir production characteristics and reservoir fluids.

"Valve" or "Valve component" refers to any device for halting or controlling the flow of a solid, liquid, gas or other material through a passage, pipe, inlet, outlet, etc.

"Wellbore" refers to a borehole; the hole drilled by the bit. A wellbore can have casing in it or it can be open (uncased); or part of it can be cased, and part of it can be open; also called well, borehole, or hole.

"Wellhead" refers to the equipment installed at the surface of the wellbore. A wellhead includes such equipment as the casing head and tubing head.

In the event that the above definitions or a description stated elsewhere in this application is inconsistent with a meaning (explicit or implicit) which is commonly used, in a dictionary, or stated in a source incorporated by reference into this application, the application and the claim terms in particular are understood to be construed according to the definition or description in this application, and not according to the common definition, dictionary definition, or the definition that was incorporated by reference. In light of the above, in the event that a term can only be understood if it is construed by a dictionary, if the term is defined by the Kirk-Othmer Encyclopedia of Chemical Technology, 5th Edition, (2005), (Published by Wiley, John & Sons, Inc.) this definition shall control how the term is to be defined in the claims.

For the purposes of this disclosure, like reference numerals in the figures shall refer to like features unless otherwise indicated and like named elements in the figures, though having differing reference numerals in respectively differing figures, shall refer to like features unless otherwise indicated.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above methods without departing from the scope of the invention, it is intended that all matter contained in the above description shall be interpreted as illustrative and not in a limiting sense.

What is claimed is:

1. A method for in-line delivery of a fluidified solid chemical and/or fluidified high-viscosity liquid chemical into an oilfield fluid stream comprising:
    fluidification of a solid chemical and/or high-viscosity liquid chemical, wherein the fluidification comprises converting the solid chemical to a fluidified state comprising molten, melted, or liquid chemical and/or melting the high-viscosity liquid chemical;
    passing the fluidified solid chemical and/or high-viscosity liquid chemical through a chemical metering valve and to a heat-traced 3-way valve,
    passing the fluidified solid chemical and/or high-viscosity liquid chemical through the heat-traced 3-way valve to a heat-traced mixing chamber;
    pumping a solvent through a solvent metering valve, through a heat-traced solvent line, and into the heat-traced mixing chamber;
    mixing the solvent and the fluidified solid chemical and/or high-viscosity liquid chemical in the heat-traced mixing chamber to achieve a desired concentration of diluted fluidified solid chemical and/or diluted fluidified high-viscosity liquid chemical; and
    delivering the diluted fluidified solid chemical and/or diluted fluidified high-viscosity liquid chemical into an oilfield fluid stream via a heat-traced diluted fluidified solid chemical and/or heat-traced diluted fluidified high-viscosity liquid chemical line.

2. The method as set forth in claim 1 wherein the heat-traced lines or valves are maintained at a temperature whereby the contents of each line or valve are at a temperature greater than about 30° C.

3. The method as set forth in claim 1 wherein the heat-traced lines or valves are maintained at a temperature whereby the contents of each line or valve are at a temperature from about 30° C. to about 200° C.

4. The method as set forth in claim 1 wherein the heat-traced line(s) or valve(s) are maintained at a temperature whereby the contents of each line or valve is at a temperature greater than the melting point of the contents of the line(s) and/or valve(s) or greater than the temperature above which the contents of the line(s) and/or valve(s) easily flow.

5. The method as set forth in claim 1 wherein the chemical metering valve and/or the solvent metering valve is heat-traced.

6. The method as set forth in claim 1 wherein the diluted fluidified solid chemical and/or diluted fluidified high-viscosity liquid chemical is homogenous.

7. The method as set forth in claim 1 wherein the chemical is selected from the group consisting of a paraffin inhibitor, an asphaltene inhibitor, a corrosion inhibitor, a scale inhibitor, a foam inhibitor, an emulsion breaker, a hydrate inhibitor, a chemical additive to change the property of the production fluid, or a combination thereof.

8. The method as set forth in claim 7 wherein the chemical comprises a paraffin inhibitor selected from the group consisting of an ethylene-vinyl acetate copolymer, an olefin-maleic anhydride copolymer or an ester thereof, a polyacrylate, an alkylphenol-formaldehyde resin, and a combination thereof.

9. The method as set forth in claim 7 wherein the chemical comprises an asphaltene inhibitor comprising an alkylphenol formaldehyde resin.

10. The method as set forth in claim 7 wherein the chemical comprises a corrosion inhibitor selected from the group consisting of an imidazoline, a quaternary amine, and a combination thereof.

11. The method as set forth in claim 7 wherein the chemical comprises a scale inhibitor selected from the group consisting of an inorganic polyphosphate, an organic phosphate ester, an organic phosphonate, an organic amino phosphate, an organic polymer, and a combination thereof.

12. The method as set forth in claim 7 wherein the chemical comprises a foam inhibitor selected from the group consisting of a polysiloxane, a polyvinylalkoxysilane, a polyvinylalkylalkoxy silane, and a combination thereof.

13. The method as set forth in claim 1 wherein the chemical is stable at a temperature of about −40° C.

14. The method as set forth in claim 1;
    wherein the chemical metering valve, the heat-traced 3-way valve, or the solvent metering valve are manipulated such that a predetermined concentration and amount of diluted fluidified solid chemical and/or diluted fluidified high-viscosity liquid chemical is delivered in-line into the oilfield fluid stream.

15. The method as set forth in claim 14 wherein the chemical metering valve, the heat-traced 3-way valve, or the solvent metering valve are manipulated such that the diluted fluidified solid chemical and/or diluted fluidified high-viscosity liquid chemical contains less than about 15 vol. % solvent.

16. A method for in-line delivery of a fluidified solid chemical into an oilfield fluid stream comprising:
fluidification of a solid chemical, wherein the fluidification comprises converting the solid chemical to a fluidified state comprising molten, melted, or liquid chemical;
passing the fluidified solid chemical through a chemical metering valve and to a heat-traced 3-way valve,
passing the fluidified solid chemical through the heat-traced 3-way valve to a heat-traced mixing chamber;
pumping a solvent through a solvent metering valve, through a heat-traced solvent line, and into the heat-traced mixing chamber;
mixing the solvent and the fluidified solid chemical in the heat-traced mixing chamber to achieve a desired concentration of diluted fluidified solid chemical; and
delivering the diluted fluidified solid chemical into an oilfield fluid stream via a heat-traced diluted fluidified solid chemical line;
wherein fluidification of the solid chemical comprises delivering the solid chemical to:
i) a receptacle, the receptacle including:
a) an inlet;
b) an outlet; and
c) a wall extending between the inlet and the outlet and defining an open interior volume, the open interior volume being in fluid communication with the inlet and the outlet and comprising a first volume and a second volume, wherein the second volume is between the outlet and the first volume;
ii) heating the solid chemical using a heating component adapted to emit heat, positioned adjacent to the outlet and separated from a majority volume of the open interior volume and a majority portion of the wall, wherein the majority volume and majority portion extend away from the heating component, such that only a portion of the majority volume and a portion of the majority portion are oriented toward the heating component;
iii) connecting an outlet conduit to the outlet at a first end and to a line for in-line delivery of a fluidified solid chemical at a second end;
iv) pressurizing the receptacle using a pressure component, the pressure component operably connected to the receptacle and adapted to apply pressure on at least a portion of the chemical in the open interior volume; and
v) discharging the liquid phase chemical through a valve adapted for enabling discharge of liquid phase chemical into the line for in-line delivery in predetermined doses,
wherein, in operation with the solid chemical loaded in the open interior volume, actuation of the heating component heats the second volume to a temperature above the melting point of the solid chemical, thereby transforming the solid chemical positioned in the second volume into liquid phase without substantive phase transformation of the solid chemical positioned in the first volume, the pressure component applies pressure on at least a portion of chemical in the receptacle and the liquid phase chemical flows from the receptacle through the outlet conduit, allowing the solid chemical in the first volume to move toward the second volume, and
wherein, at a point in time during discharging, the portion of the liquid phase chemical represents less than 90% of total chemical in the receptacle.

17. The method as set forth in claim 16 further comprising controlling the flow of the solid chemical from the first volume to the second volume with a mechanical handling device.

18. A method for in line delivery of a fluidified high viscosity liquid chemical into an oilfield fluid stream comprising:
fluidification of a high-viscosity liquid chemical, wherein the fluidification comprises melting the high-viscosity liquid chemical;
passing the fluidified high-viscosity liquid chemical through a chemical metering valve and to a heat-traced 3-way valve,
passing the fluidified high-viscosity liquid chemical through the heat-traced 3-way valve to a heat-traced mixing chamber;
pumping a solvent through a solvent metering valve, through a heat-traced solvent line, and into the heat-traced mixing chamber;
mixing the solvent and the fluidified high-viscosity liquid chemical in the heat-traced mixing chamber to achieve a desired concentration of diluted fluidified high-viscosity liquid chemical; and
delivering the diluted fluidified high-viscosity liquid chemical into an oilfield fluid stream via a heat-traced diluted fluidified high-viscosity liquid chemical line;
wherein fluidification of the high-viscosity liquid chemical comprises delivering the high-viscosity liquid chemical to:
i) a receptacle, the receptacle including:
a) an inlet;
b) an outlet; and
c) a wall extending between the inlet and the outlet and defining an open interior volume, the open interior volume being in fluid communication with the inlet and the outlet and comprising a first volume and a second volume, wherein the second volume is between the outlet and the first volume;
ii) heating the high-viscosity liquid chemical using a heating component adapted to emit heat, positioned adjacent to the outlet and separated from a majority volume of the open interior volume and a majority portion of the wall, wherein the majority volume and majority portion extend away from the heating component, such that only a portion of the majority volume and a portion of the majority portion are oriented toward the heating component;
iii) connecting an outlet conduit connected to the outlet at a first end and to a line for in-line delivery of a fluidified high-viscosity liquid chemical at a second end;
iv) pressurizing the receptacle using a pressure component, the pressure component operably connected to the receptacle and adapted to apply pressure on at least a portion of the chemical in the open interior volume; and v) discharging the fluidified high-viscosity liquid chemical through a valve adapted for enabling discharge of fluidified high-viscosity liquid chemical into the line for in-line delivery in predetermined doses, wherein, in operation with a high viscosity liquid chemical loaded in the open interior volume, actuation of the heating component heats the second volume to a temperature above which the high viscosity liquid chemical easily flows (a kinematic viscosity of less than 1000 cSt when measured at 25° C.), thereby lowering the viscosity of the liquid chemical positioned in the second volume without substantive change in the viscosity of the high viscosity liquid chemical positioned in the first volume, the pressure component applies pressure on at least a portion of chemical in the receptacle and the fluidified high-viscosity liquid chemical flows from the receptacle through the outlet conduit, allowing the high viscosity liquid chemical in the first volume to move toward the second volume, and wherein, at a point in time during discharging, the portion of the fluidified high-viscosity liquid chemical represents less than 90% of total chemical in the receptacle.

19. A method for in-line delivery of a solid chemical into an oilfield fluid stream comprising:

reducing a particle diameter of the solid chemical such that the solid chemical is flowable through a pipe;

passing the size-reduced solid chemical through a chemical metering valve and to a 3-way valve, passing the size-reduced solid chemical through the 3-way valve to a heat-traced mixing chamber;

pumping a solvent through a solvent metering valve, through a heat-traced solvent line, and into the heat-traced mixing chamber;

mixing the solvent and the size-reduced solid chemical in the heat-traced mixing chamber to achieve a desired concentration of diluted size-reduced solid chemical; and delivering the diluted size-reduced solid chemical into an oilfield fluid stream via a heat-traced diluted size-reduced solid chemical line.

* * * * *